US012641119B2

(12) United States Patent
Avina et al.

(10) Patent No.: US 12,641,119 B2
(45) Date of Patent: May 26, 2026

(54) SYSTEMS AND METHODS FOR DETECTION OF PHISHING WEBPAGES THROUGH AUTOENCODER TECHNIQUES

(71) Applicant: Splunk Inc., San Francisco, CA (US)

(72) Inventors: Glory Emmanuel Avina, Brentwood, CA (US); Abhinav Mishra, San Francisco, CA (US); Kumar Sharad, Dresden (DE)

(73) Assignee: Cisco Technology, Inc., San Jose, CA (US)

( * ) Notice: Subject to any disclaimer, the term of this patent is extended or adjusted under 35 U.S.C. 154(b) by 2 days.

(21) Appl. No.: 18/651,332

(22) Filed: Apr. 30, 2024

(65) Prior Publication Data

US 2025/0337777 A1 Oct. 30, 2025

(51) Int. Cl.
*H04L 29/06* (2006.01)
*H04L 9/40* (2022.01)

(52) U.S. Cl.
CPC ................................ *H04L 63/1483* (2013.01)

(58) Field of Classification Search
CPC ................................................... H04L 63/1483
See application file for complete search history.

(56) References Cited

U.S. PATENT DOCUMENTS 7,937,344 B2 5/2011 Baum et al.
8,112,425 B2 2/2012 Baum et al.

8,751,529 B2 6/2014 Zhang et al.
8,788,525 B2 7/2014 Neels et al.
9,215,240 B2 12/2015 Merza et al.
9,286,413 B1 3/2016 Coates et al.
10,127,258 B2 11/2018 Lamas et al.
11,438,377 B1 * 9/2022 Azarafrooz .............. G06N 3/08
2019/0098106 A1 3/2019 Mungel et al.

(Continued)

FOREIGN PATENT DOCUMENTS

CA 3068953 A1 1/2019

OTHER PUBLICATIONS

Splunk Enterprise 8.0.0 Overview, available online, retrieved May 20, 2020 from docs.splunk.com.

(Continued)

*Primary Examiner* — Wasika Nipa
(74) *Attorney, Agent, or Firm* — Rutan & Tucker LLP; Kyle M. St. James

(57) ABSTRACT

One implementation is directed to a phishing detection methodology including operations of obtaining an image of a candidate phishing webpage having a login screen component, where encoder is deployed on the image resulting in the generation of a latent representation corresponding to the login screen component. The login screen component may then be classified as one of a defined set of classes by deploying a machine learning model taking the latent representation as input. Further, an additional operation may include obtaining allow/deny lists of account authentication providers for the domain of the URL of the candidate phishing webpage. Finally, a determination may be made as to whether the candidate phishing webpage is a phishing webpage when the login class assigned by the classifying machine learning model does not appear on the allow list.

20 Claims, 14 Drawing Sheets

(56) References Cited

U.S. PATENT DOCUMENTS

2020/0358819 A1    11/2020  Bowditch et al.
2021/0344711 A1*   11/2021  Cleveland ............. H04L 9/3236

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
G. E. Avina, et al. "Systems and Methods for Detection of Typosquatting Domain Names Through Deployment of Language Models and Generation Of Targeted Training Data Therefore," filed Apr. 30, 2024, U.S. Appl. No. 18/651,305 including its prosecution history. PCT/US2025/026691 filed Apr. 28, 2025, International Search Report and Written Opinion dated Jun. 17, 2025.

* cited by examiner

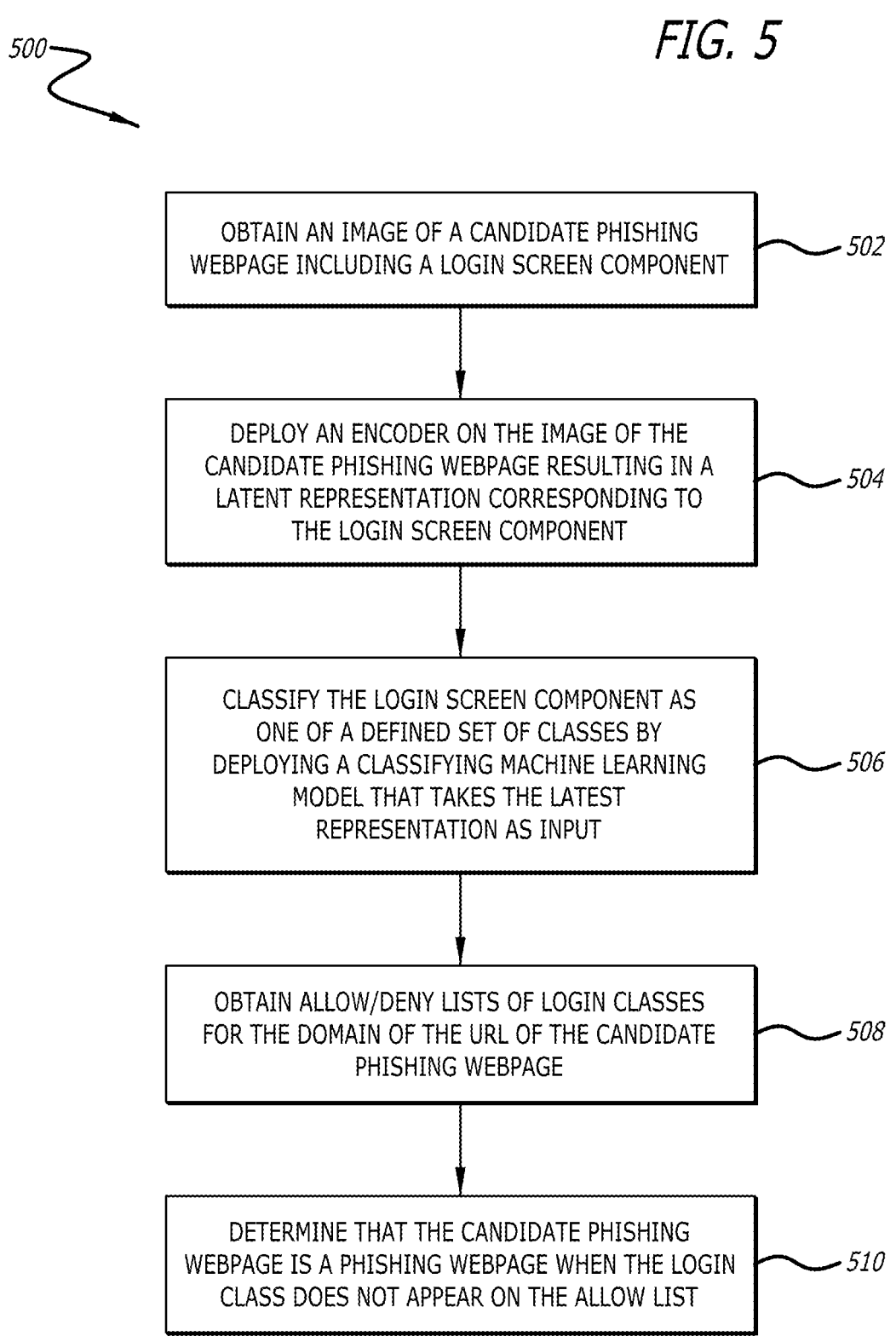

OBTAIN AN IMAGE OF A CANDIDATE PHISHING WEBPAGE INCLUDING A LOGIN SCREEN COMPONENT ~ 502

DEPLOY AN ENCODER ON THE IMAGE OF THE CANDIDATE PHISHING WEBPAGE RESULTING IN A LATENT REPRESENTATION CORRESPONDING TO THE LOGIN SCREEN COMPONENT ~ 504

CLASSIFY THE LOGIN SCREEN COMPONENT AS ONE OF A DEFINED SET OF CLASSES BY DEPLOYING A CLASSIFYING MACHINE LEARNING MODEL THAT TAKES THE LATEST REPRESENTATION AS INPUT ~ 506

OBTAIN ALLOW/DENY LISTS OF LOGIN CLASSES FOR THE DOMAIN OF THE URL OF THE CANDIDATE PHISHING WEBPAGE ~ 508

DETERMINE THAT THE CANDIDATE PHISHING WEBPAGE IS A PHISHING WEBPAGE WHEN THE LOGIN CLASS DOES NOT APPEAR ON THE ALLOW LIST ~ 510

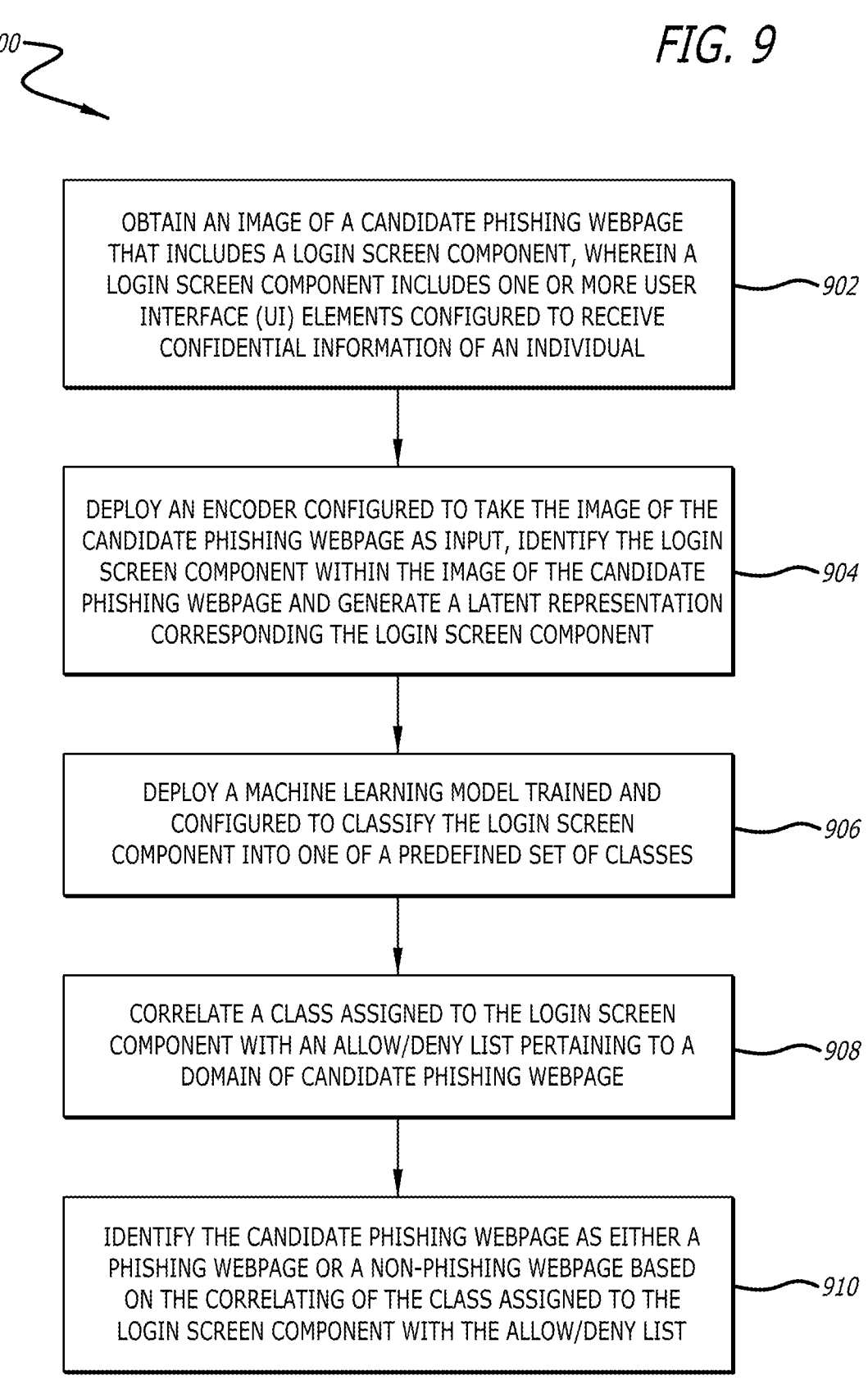

OBTAIN AN IMAGE OF A CANDIDATE PHISHING WEBPAGE THAT INCLUDES A LOGIN SCREEN COMPONENT, WHEREIN A LOGIN SCREEN COMPONENT INCLUDES ONE OR MORE USER INTERFACE (UI) ELEMENTS CONFIGURED TO RECEIVE CONFIDENTIAL INFORMATION OF AN INDIVIDUAL — 902

DEPLOY AN ENCODER CONFIGURED TO TAKE THE IMAGE OF THE CANDIDATE PHISHING WEBPAGE AS INPUT, IDENTIFY THE LOGIN SCREEN COMPONENT WITHIN THE IMAGE OF THE CANDIDATE PHISHING WEBPAGE AND GENERATE A LATENT REPRESENTATION CORRESPONDING THE LOGIN SCREEN COMPONENT — 904

DEPLOY A MACHINE LEARNING MODEL TRAINED AND CONFIGURED TO CLASSIFY THE LOGIN SCREEN COMPONENT INTO ONE OF A PREDEFINED SET OF CLASSES — 906

CORRELATE A CLASS ASSIGNED TO THE LOGIN SCREEN COMPONENT WITH AN ALLOW/DENY LIST PERTAINING TO A DOMAIN OF CANDIDATE PHISHING WEBPAGE — 908

IDENTIFY THE CANDIDATE PHISHING WEBPAGE AS EITHER A PHISHING WEBPAGE OR A NON-PHISHING WEBPAGE BASED ON THE CORRELATING OF THE CLASS ASSIGNED TO THE LOGIN SCREEN COMPONENT WITH THE ALLOW/DENY LIST — 910

SYSTEMS AND METHODS FOR DETECTION OF PHISHING WEBPAGES THROUGH AUTOENCODER TECHNIQUES

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Phishing is a type of cyberattack that involves fraudulent attempts to trick individuals or organizations into revealing sensitive information, such as login credentials, financial data, or personal information. Phishing attacks may take various forms including webpages generated by malicious actor that are designed to appear as though they are from a trusted source, such as a legitimate company, government agency, or financial institution. A goal of a phishing webpage may be to manipulate a visitor into taking a specific action such as providing login credentials to the webpage thereby providing such to the malicious actor. Another goal of a phishing webpage may be to manipulate the visitor to click on a link or download an attachment, which can lead to various malicious activities, including identity theft, financial fraud, and the spread of malware.

BRIEF DESCRIPTION OF THE DRAWINGS

Illustrative examples are described in detail below with reference to the following figures:

FIG. 5 is a flowchart illustrating an example process of operations for performing a phishing detection methodology according to an implementation of the disclosure;

FIG. 9 is a flowchart illustrating an example operations for performing a phishing detection methodology according to an implementation of the disclosure;

DETAILED DESCRIPTION

Figure 1:
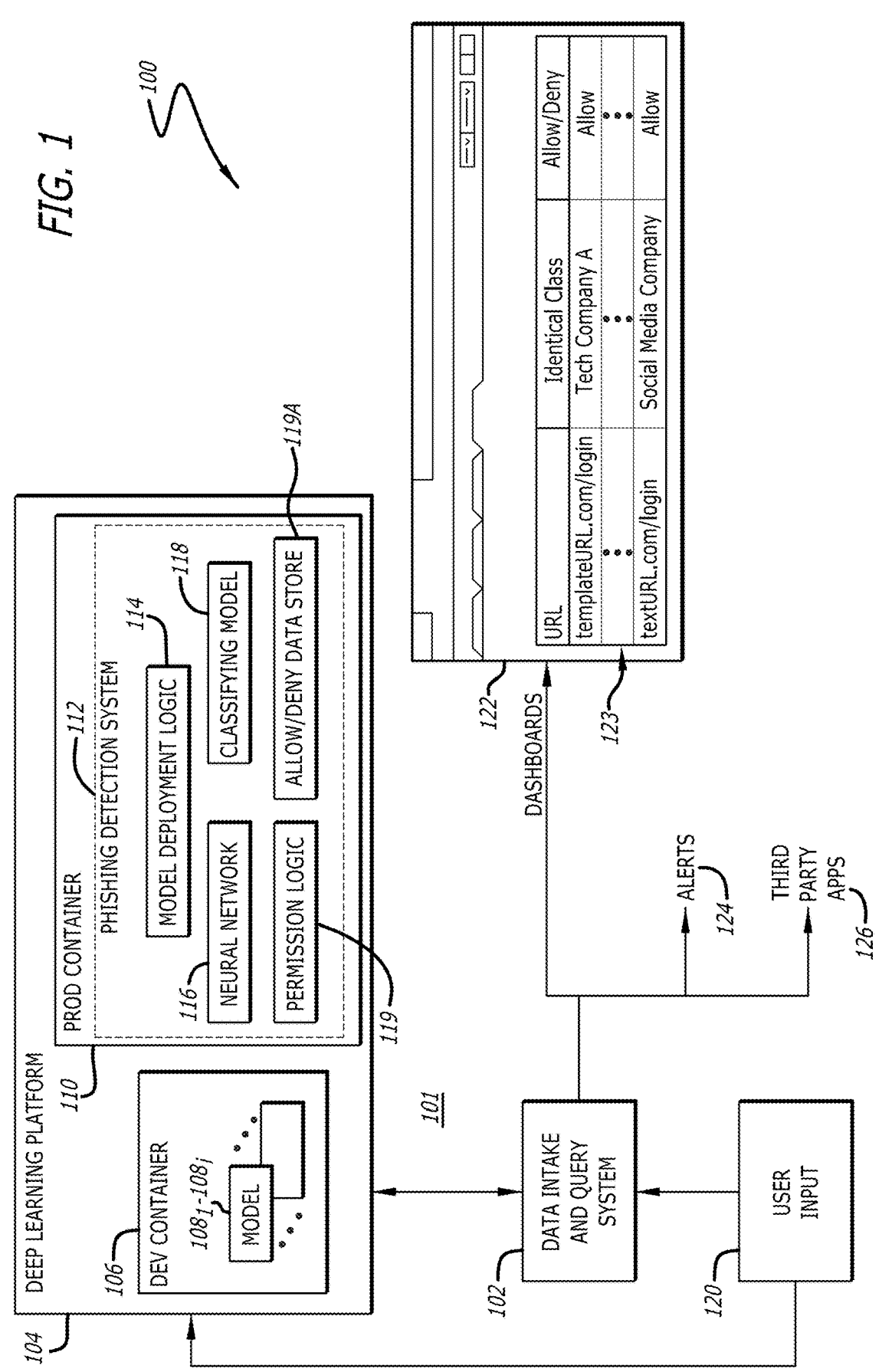
FIG. 1 is a block diagram illustrating a networked environment configured with network components and logic according to an implementation of the disclosure.

One well-known type of cyber-attack is referred to as phishing, which typically includes a cyber-attacker (or bad actor) utilizing deceptive techniques intended try to trick individuals to provide confidential information usually in the form of usernames, passwords, credit card information, bank account information, etc. Phishing attacks may take various forms such as emails, text messages, webpages, and/or a combination thereof and impersonating a trusted source such as a colleague, reputable business, or financial institution.

In some specific instances, phishing webpages may include a login screen component that attempts to mimic that of a trusted source, such as a well-known technology company or social media company that often provide a legitimate method for an individual to login to an internet-based account. For example, many software applications now provide services through the internet and require an individual to login into their account to access the services. In many examples, the software application may have a well-known login screen component that has a recognizable aesthetic and includes user interface (UI) elements such as text boxes that are configured to receive user input, which typically includes the individual's confidential information such as a username and password.

Cyber-attackers generate phishing webpages that mimic the recognizable aesthetic of a reputable, well-known technology company or social media company, and similarly include UI elements that are configured to receive an individual's confidential information. However, when an individual provides their confidential information, the confidential information is provided to the cyber-attacker instead of logging the individual into their account as was the intention.

While malware detection methodologies have been developed to detect phishing webpages that include a login screen component, these methodologies have a significant downfall and have been rendered mostly ineffective by design-arounds employed by cyber-attacks. Specifically, current malware detection methodologies typically obtain an image of a legitimate login screen component of a technology company, for example, and generate a hash value of the legitimate screen component. Next, current malware detection methodologies include obtaining an image of a suspicious or unknown webpage that includes a login screen component. A hash is generated for the login screen component of the suspicious or unknown webpage and the two hashes are compared. When the login screen component of the suspicious or unknown webpage is a direct copy of the login screen component of the technology company, current malware detection methodologies flag the suspicious or unknown webpage as phishing.

However, cyber-attackers have designed-around these current malware detection methodologies by altering minor aspects of the login screen components used on phishing webpages, which avoids detection based on a hash comparison as detailed above. As is understood, hash comparisons require an exact copy to note a match. Thus, by making minor alterations to the login screen component for a phishing webpage that is unlikely to be noticed by an individual. For example, a cyber-attacker may adjust the wording labeling some text boxes changing verbiage from "sign-in" to "verify account." As another example, a cyber-attacker may subtly adjust the color of the login screen component or placement of pixels in a way that is difficult for a user to visually detect. Therefore, while current malware detection methodologies may detect some phishing webpages having duplicative login screen components as well-known technology companies or social media companies, such methodologies are unable to detect the vast majority of phishing webpages due to the simple design-arounds discussed above.

Some particular implementations of the disclosure provide for a method that includes operations of obtaining an image of a candidate phishing webpage that includes a login screen component and deploying an encoder on the image of the candidate phishing webpage resulting in the generation of a latent representation corresponding to the login screen component. Following deployment of the encoder to generate the latent representation of the login screen component of the candidate phishing webpage, the login screen component is classified as one of a defined set of classes by deploying a machine learning model configured to take the latent representation as input. In addition to classifying the login screen component into one of a predefined set of classes based on a latent representation thereof, an additional operation may include obtaining allow/deny lists of account authentication providers for the domain of the URL of the candidate phishing webpage. Finally, a determination may be made as to whether the candidate phishing webpage is a phishing webpage when the login class assigned by the classifying machine learning model does not appear on the allow list.

Thus, a clear advantage of the phishing detection methodologies discussed herein includes the ability to accurately detect phishing webpages that include a login screen component that is similar to a login screen component of a well-known technology company, social media company, or others, but which is not an exact duplicate.

Referring now FIG. 1, a block diagram illustrating a networked environment configured with network components and logic is shown according to an implementation of the disclosure. The logic, upon execution by one or more processors, may be configured to obtain input data (e.g., stored data or user input), analyze the input data with one or more machine learning models such as the neural network 116 and the classifying machine learning model 118, and provide results and/or one or more dashboards 122 to a data intake and query system instance 102, which may execute a search query the results of which provide information for at least a first dashboard. The networked environment 100 includes several components including hardware and software that are communicatively coupled through a network, namely the internet, which may be represented by reference number 101. As illustrated, the networked environment 100 includes a data intake and query system 102 communicatively coupled to a deep learning platform 104, which may include multiple containers such as a DEV container 106 and PROD container 110.

The term container may refer to a standalone, executable software package configured to run one or more applications. For example, the DEV container 106 may be a software package configured to run on cloud computing resources and perform machine learning model training. Additionally, the PROD container 110 may be a software package configured to run on cloud computing resources and execute one or more machine learning models such as the neural network 116 and the classifying machine learning model 118 on input data (user input 120) provided by the data intake and query system 102 or otherwise directly from a client device. For example, and as discussed below, the data intake and query system 102 may provide event logs or alerts (or at times, referred to as "notables") corresponding to uniform resource locators (URLs). The alerts corresponding to URLs are then analyzed by the phishing detection system 112 operating with the PROD container 110, which is configured to deploy trained machine learning models, e.g., the neural network 116 and the classifying machine learning model 118, resulting in a determination as to whether each URL corresponds to a phishing webpage.

As discussed in further detail below, the model deployment logic 114 may be configured to, upon execution by one or more processors, receive one or more URLs or images of a webpage corresponding to a URL, or otherwise obtain such e.g., via querying a data store, and deploy the neural network 116 by providing an image of the webpage corresponding to the URL as input thereto. The neural network 116 is configured to analyze the image, identify a login screen component included as part of the webpage, and generate a latent representation of the login screen component. The model deployment logic 114 is configured to, upon execution by one or more processors, deploy the classifying machine learning model 118 by providing the latent representation as input thereto. The classifying machine learning model 118 is configured to classify the latent representation into one of a predefined set of classes, which as discussed below, may correspond to technology companies, social media companies, single sign-on providers (e.g., Okta, Inc.), etc. (which may collectively or generally be referred to as an authenticator). Additionally, one of the predefined classes may correspond to unknown login in screen components (e.g., that do not closely correspond to any of the classes as determined by the classifying machine learning model 118).

The permission logic 119 may be configured to, upon execution by one or more processors, retrieve one or more of an allow/deny list from an allow/deny list data store 119A, and determination whether the class to which the login screen component of the webpage image was assigned by the classifying machine leaning model 118 is permissible by the domain owner. Thus, in some examples, the permission logic 119 may determine a domain of the URL and correlate whether the assigned class appears on either of the allow/deny lists for that domain. The allow/deny lists may be predefined and provided by the domain owner in some implementations. When the assigned class (e.g., corresponding to the company associated with the login screen component such as a technology company, social media, etc.) appears on the allow list, the URL may be determined to be legitimate, e.g., not phishing. When the assigned class appears on the deny list or on neither list, the URL may be determined to be phishing.

The analyses performed by the deep learning platform 104 may result in certain actions performed automatically including generation and display of a dashboard or graphical user interface (GUI) 122, generation and display or transmission of alerts 124, and/or generation of instructions for or actions performed automatically using a third-party application 126 (e.g., an email client such as, for example, OUTLOOK® provided by Microsoft Corporation, or other email or messaging client where the phishing detection system 112 initiates the transmission of information to an end user and/or instructs the email or messaging client to take action such as moving emails from an inbox to a spam folder, deleting an email, flagging an email, etc.).

In some implementations, upon a determination as to whether one or more URLs correspond to phishing webpages, one or more graphical user interfaces (GUIs), e.g., the GUIs 122, are generated to display phishing analysis data, such as a listing of URLs, identified classes, and an allow/deny indication (listing 123). In some instances, such as following a determination by the phishing detection system 112 that a URL corresponds to a phishing webpage, the data intake and query system 102 may execute a search query, such as a pipelined search query configured to determine certain statistics corresponding to the URL or other network traffic. For example, the data intake and query system 102 may query data stores (not shown) for events corresponding to network traffic to the URL, e.g., network packets, or emails that included the URL, such as within the email body or an attachment. The amount of network traffic to the webpage may be provided in graphical form in a dashboard, which may indicate to a SOC analyst whether there has been an anomalous amount of traffic to the URL, which could be indicative of a larger phishing attack such as on an enterprise.

In some examples, a listing of URLs 123 may be provided as part of the dashboard 122 that lists one or more URLs (or a label corresponding thereto), an identified class of the login screen component included on the webpage of the URL, and an indication as to whether the identified class appears on either of an allow/deny list corresponding to the domain of the URL.

Figure 2:
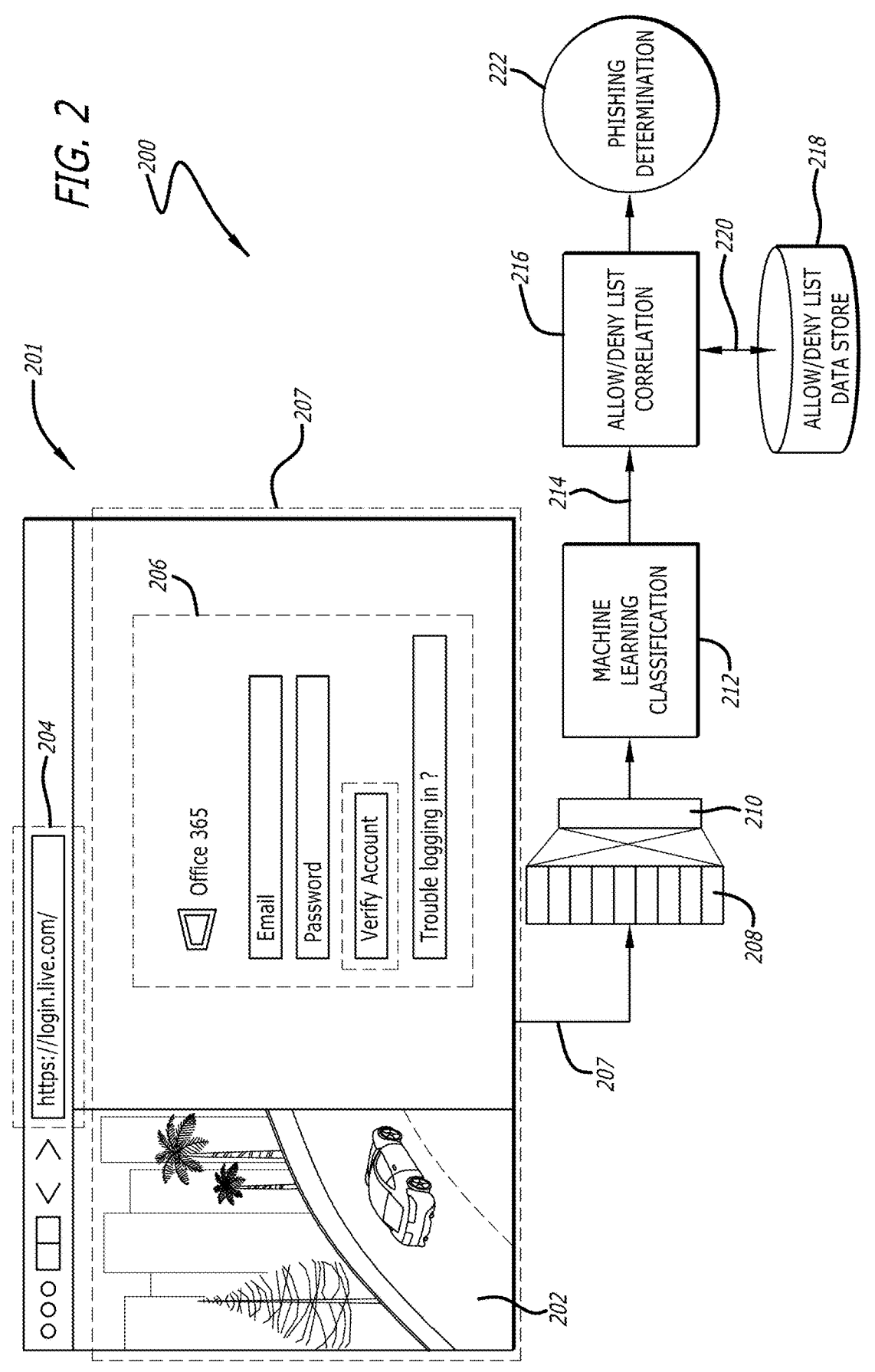
FIG. 2 is a diagrammatic flow illustrating a first implementation of performing a phishing detection methodology according to an implementation of the disclosure.

Referring now to FIG. 2, a diagrammatic flow illustrating a first implementation of performing a phishing detection methodology is shown according to an implementation of the disclosure. FIG. 2 illustrates a flow 200 that includes a webpage 201 to be analyzed as a candidate phishing webpage. The example webpage 201 includes sample background imagery 202, a URL 204 (as displayed in an internet browser), and a login screen component 206. As shown, the example login screen component 206 may include branding or trade dress pertaining to a technology company, social media company, single sign-on company, etc., as well as user interface (UI) elements configured to receive an individual's confidential information such as an email or username and password. Additionally, the example login screen component 206 may include a UI element configured to be activated that results in submission of the confidential information to a backend system, which may belong to a legitimate, trusted authenticator (e.g., Microsoft Corporation) or to a cyber-attacker. As is understood, phishing webpages that include a login screen component typically aim to mimic the appearance of a legitimate, trusted authenticator so that an individual is tricked into providing their confidential information to the cyber-attacker that created the phishing webpage.

The flow 200 is shown to include an image 207 of the webpage 201 provided as input to a neural network 208, which processes the image 207 and generates a latent representation 210. The flow 200 continues with performance of a machine learning classification, by for example, a classifying machine learning model, on the latent representation 210. The machine learning classification 212 results in determination of a class assignment for the latent representation 210 ("classification 214"). The class may be one of a predefined set of classes that each correspond to a technology company, social media company, single sign-on provider, a particular domain, or even of known phishing attacks. The classification 214 is then utilized in a correlation 216 with an allow/deny list 220 that may be retrieved from an allow/deny list data store 218 (which may correspond to the allow/deny list data store 119A of FIG. 1). Based on the correlation, a phishing determination 222 is made indicating whether the webpage 201 corresponds to phishing or includes a login screen component 206 from a legitimate authenticator.

Figure 3A:
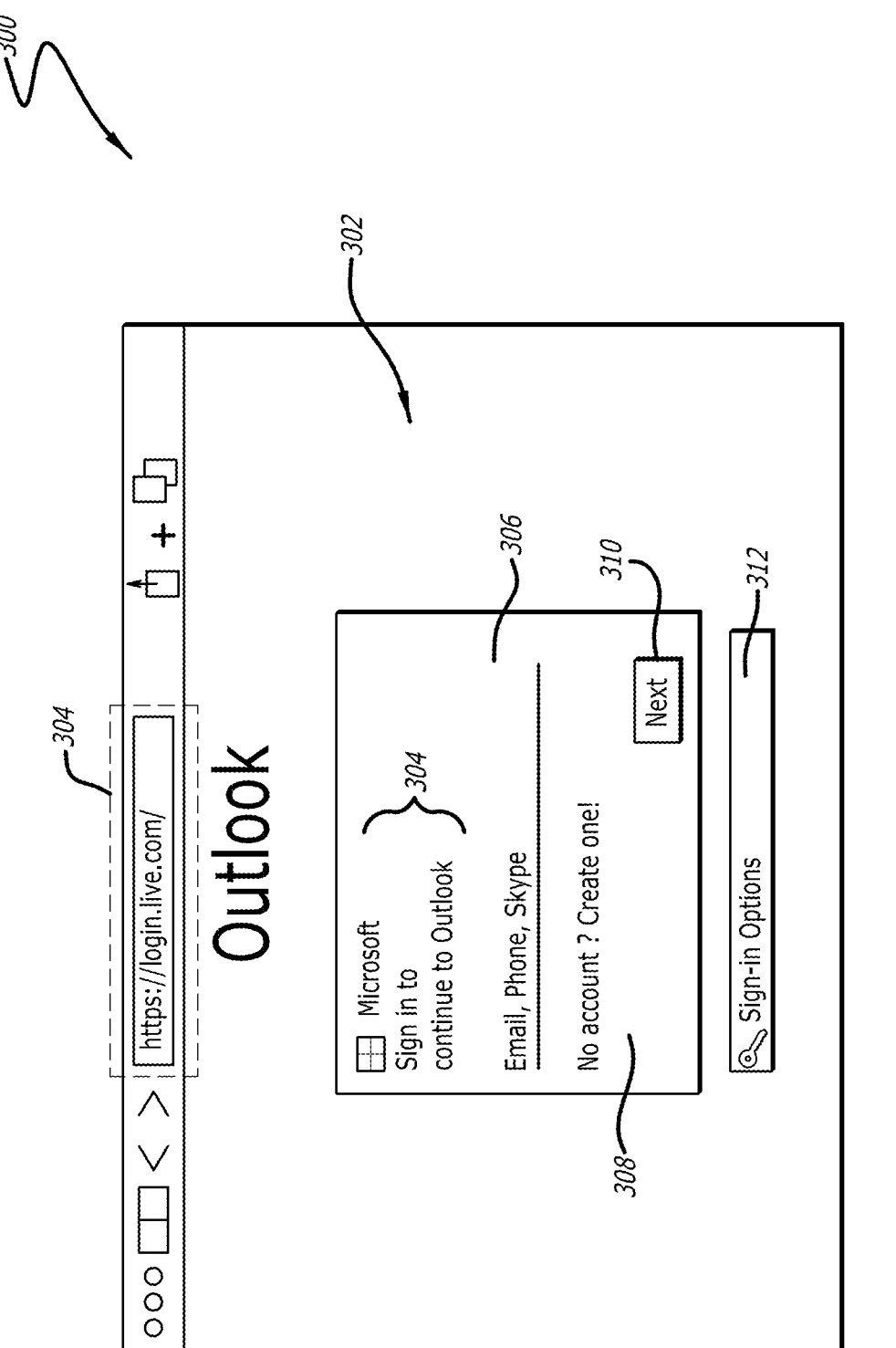
FIG. 3A is an example illustration of a first legitimate, non-phishing login screen according to an implementation of the disclosure.

Referring to FIG. 3A, an example illustration of a first legitimate, non-phishing login screen is shown according to an implementation of the disclosure. The webpage 300 provides a first example illustration of a legitimate login screen component 302 accessible by an individual via an internet browser at the URL 304. The webpage 300 is shown to be that provided by Microsoft Corporation in association with its email client OUTLOOK®. In the example webpage 300, the login screen component 302 is shown to include branding of Microsoft Corporation (branding 304), a UI element 306 being a text box configured to receive a username or user identifier such as an email, phone number, or SKYPE® number or username. Additionally, the login screen component 302 includes a selectable icon 308 ("No account? Create one!") that may be a link to another webpage, a UI element 310 ("Next" button) configured to receive user input activating the UI element 310 and provide the confidential information to a backend and/or provide a secondary webpage (not shown) that includes a UI element to configured to receive a password. Further the sample webpage 300 may include a UI element 312 ("Sign-in Options" button) that is configured to receive user input activating the UI element 312 to provide a third webpage with alternative login options for the individual.

Figure 3B:
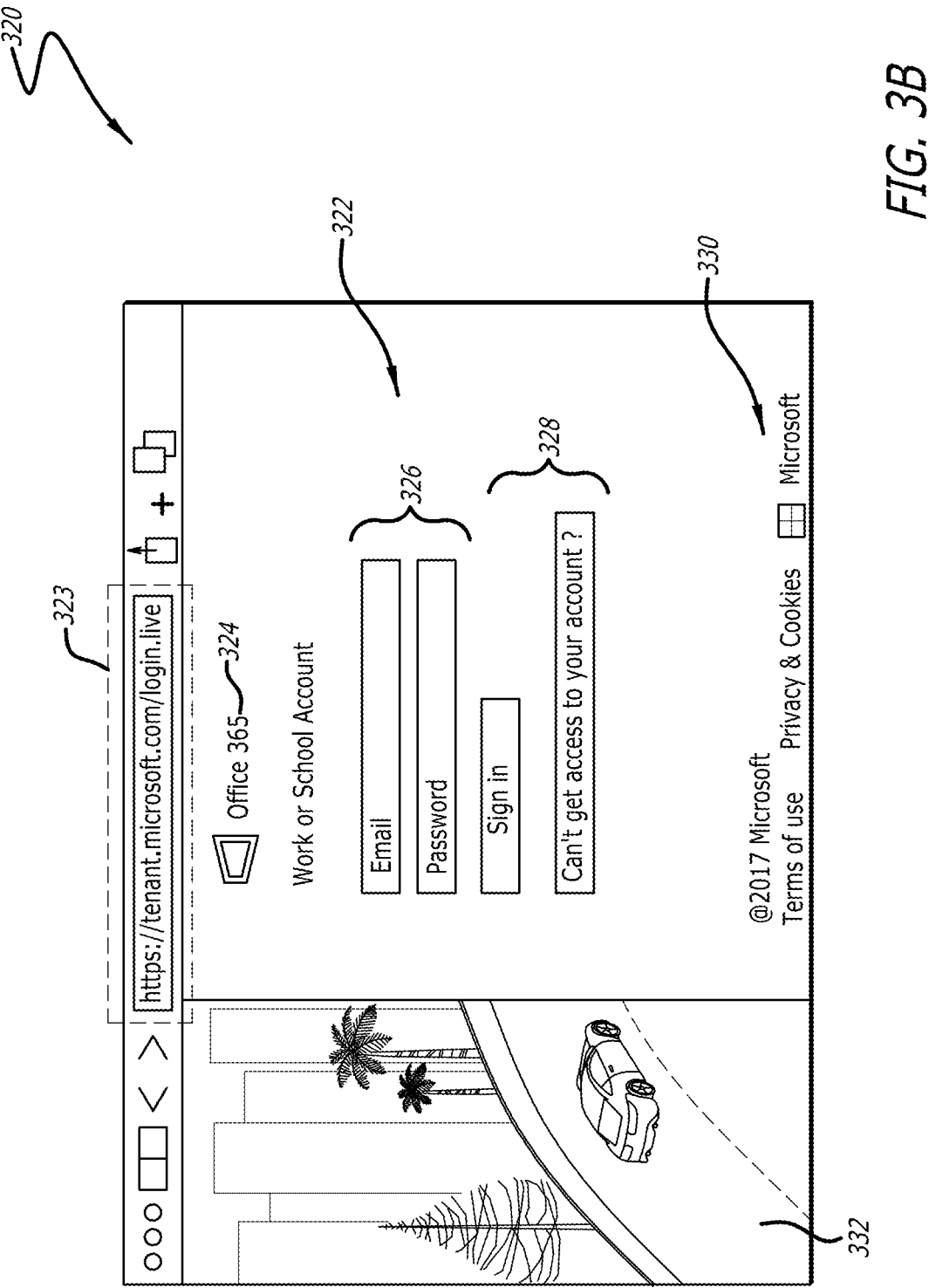
FIG. 3B is an example illustration of a second legitimate, non-phishing login screen according to an implementation of the disclosure.

Referring to FIG. 3B, an example illustration of a second legitimate, non-phishing login screen is shown according to an implementation of the disclosure. The webpage 320 provides a second example illustration of a legitimate login screen component 322 accessible by an individual via an internet browser at the URL 323. The webpage 320 is shown to be provided by Microsoft Corporation in association with its software as a service (SaaS) platform of OFFICE 365®. In the example webpage 320, the login screen component 322 is shown to include branding of Microsoft Corporation (branding 324), UI elements 326 being text boxes configured to receive a username or user identifier such as an email, phone number, or SKYPE® number or username, and a corresponding password. Additionally, the login screen component 322 includes selectable icons 328 ("Sign In" and "Can't get access to your account?") that may submit the confidential information provided in UI elements 326 to a backend server or link to another webpage, e.g., to recover a forgotten password. Additional branding 330 may also be provided.

Figure 4:
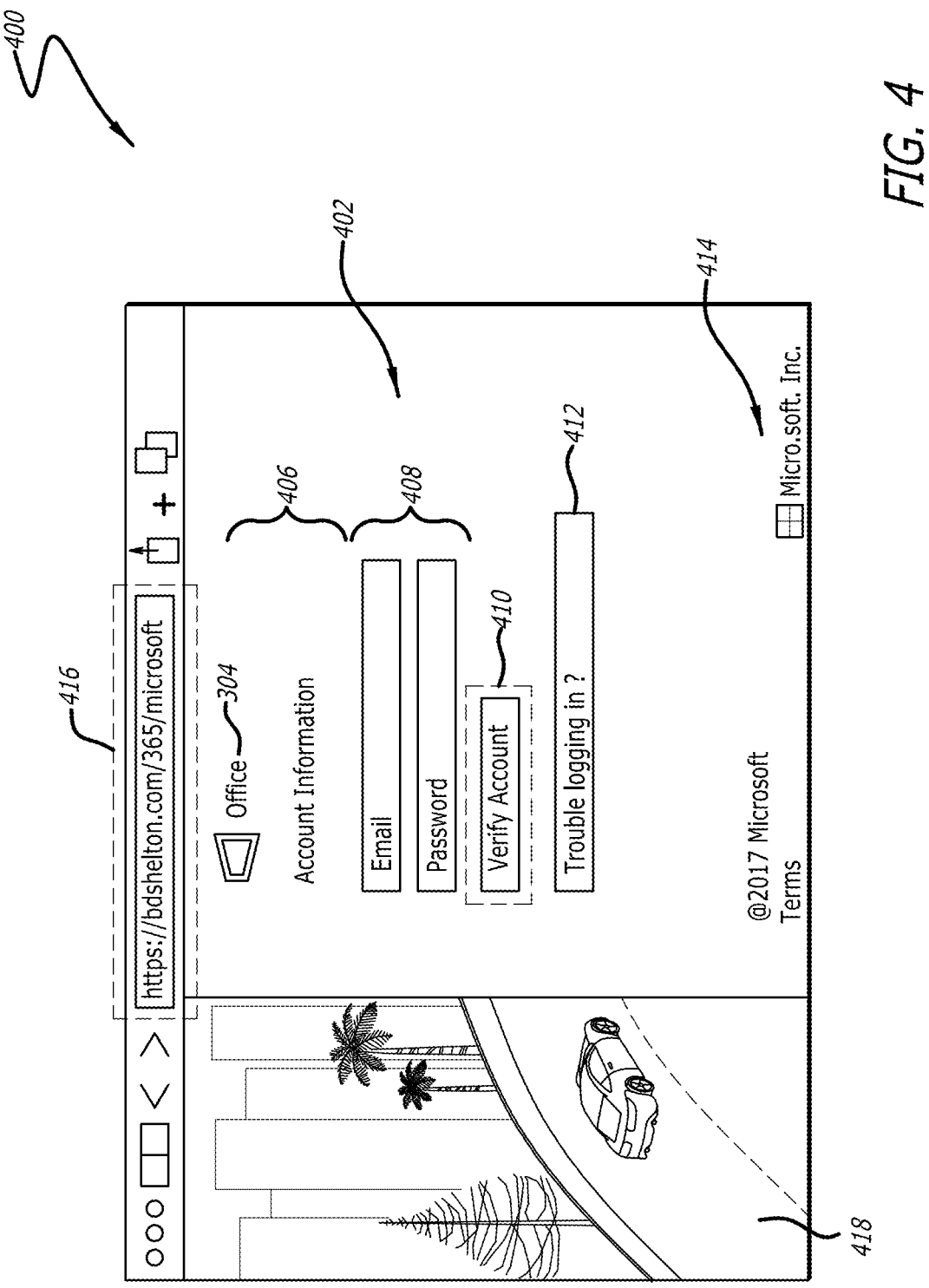
FIG. 4 is an example illustration of a phishing login screen according to an implementation of the disclosure.

Referring to FIG. 4, an example illustration of a phishing login screen is shown according to an implementation of the disclosure. The webpage 400 provides an example illustration of a phishing webpage including a login screen component 402 accessible by an individual via an internet browser at the URL 416. The webpage 400 is shown to mimic an authentic webpage provided by Microsoft Corporation in association with its software as a service (SaaS) platform of OFFICE 365®. In the example webpage 400, the login screen component 402 is shown to include branding 406 similar to that typically provided by Microsoft Corporation but with minor alterations such as the use of "Office" instead of "Office 365" and "Account Information" instead of "Work of School Account," as compared to the sample illustration of FIG. 3B. It should be understood that the samples of FIGS. 3A-4 are merely for illustrative purposes and the disclosure is in no way intended to be limited to these examples.

The webpage 400 also includes UI elements 408 configured to receive confidential information such as a username and password, as well as the UI element 410 configured to transmit the confidential information provided in UI elements 408 to a backend server controlled by a cyberattacker. The webpage 400 may also include a UI element 412 ("Trouble logging in?" box), which may link to another webpage, e.g., one asking for additional confidential information. In some examples, phishing webpages may include additional branding 414 that appears similar to legitimate branding but includes minor alterations (e.g., "Terms" instead of "Terms of Use," the exclusion of "Privacy & Cookies," and "Micro.soft, Inc." instead of "Microsoft." Both webpages 320 and 400 may include the same or similar background scenery 332, 418. It is important to note that the minor differences between the webpages 320 and 400 are unlikely to register with an individual while browsing the internet and will not be flagged by a hash comparison of the login screen components 322 and 402.

Referring now to FIG. 5, a flowchart illustrating an example process of operations for performing a phishing detection methodology is shown according to an implementation of the disclosure. Each block illustrated in FIG. 5 represents an operation in the process 500 performed by, for example, the phishing detection system 112 of FIG. 1. It should be understood that not every operation illustrated in FIG. 5 is required. In fact, certain operations may be optional to complete aspects of the process 500. The discussion of the operations of process 500 may be done so with reference to any of the previously described figures. The process 500 begins with an operation of obtaining an image of a candidate phishing webpage that includes a login screen component (block 502).

The phishing detection methodology of FIG. 5 includes deploying an encoder on the image of the candidate phishing webpage resulting in the generation of a latent representation corresponding to the login screen component (block 504). As is described in further detail herein, for example with respect to FIGS. 6-8, implementations of the phishing detection methodology may utilize a trained encoder component of an autoencoder, which is understood to include an encoder for compressing data into a latent representation and a decoder for decoding and restoring the data from the latent representation. However, one technological advantage of the phishing detection methodology is that processing resources are saved by performing the phishing detection methodology on the latent representation of the login screen component without requiring use of the decoder. As one of ordinary skill understands, processing of the decoder to reconstruct the data from the latent representation is resource intensive and requires significant computing time and power. As a result, implementations of the phishing detection methodology disclosed herein provide a clear improvement to the processing of a computer as compared to current phishing detection methodologies at least by foregoing processing by the decoder component of an autoencoder. For at least the same reason, implementations of the phishing detection methodology disclosed herein also provide a significant improvement in the technology field of phishing detection over current phishing detection methodologies.

Following deployment of the encoder to generate the latent representation of the login screen component of the candidate phishing webpage, the login screen component is classified as one of a defined set of classes by deploying a machine learning model configured to take the latent representation as input (block 506). In some examples, the machine learning model may be trained based on a K-Nearest Neighbor machine learning algorithm. In some example, each of the predefined set of classes correspond to a technology company, social media company, single sign-on provider, a particular domain, or even of known phishing attacks. Thus, in some implementations, a predefined set of classes may include a first class corresponding to MICROSOFT OFFICE 365®, a second class corresponding to Meta Platforms, Inc. (formerly, Facebook, Inc.), a third corresponding to Okta, Inc., and a fourth class corresponding to unknown login screen components.

In addition to classifying the login screen component into one of a predefined set of classes based on a latent representation thereof, implementations of the phishing detection methodology of FIG. 5 include obtaining allow/deny lists of account authentication providers for the domain of the URL of the candidate phishing webpage (block 508). An account authentication provider may be a technology company, a social media company, etc., that provides a login screen component and authenticates a user account based on the login information provided to the login screen component, e.g., username and password. In some implementations, the allow/deny lists may be predefined, such as by the owner of a domain, and used to indicate, to the phishing detection system 112 of FIG. 1, which account authentication providers have been specified for use by individuals to login to their account with the domain.

For example, a domain owner may deploy internet technology or other software provided by one or more technology companies and enable an individual to sign into their account for the domain through any of the one or more technology companies (e.g., Microsoft Corporation, or PayPal Holdings, Inc.). Thus, an individual may provide their login credentials to a login screen component that appears on a landing webpage of the domain, where the login screen component appears to visually correspond to one of the technology companies, for example, see FIGS. 3A-3B. Thus, the domain owner may add such technology companies to an allow list for the domain, which indicates to the phishing detection system 112 of FIG. 1 that display of the login screen component corresponding to the technology is permissible and not phishing. In some instances, other well-known technology companies ("alternative technology companies") that are not utilized by the domain may be added to a deny list, which indicates to the phishing detection system 112 of FIG. 1 that display of the login screen component corresponding to these alternative technology companies is not permitted and signals phishing.

Similarly, it has become common for social media companies, such as Meta Platforms, Inc. (formerly, Facebook, Inc.), to provide authentication functionality for domains. Thus, in a manner similar to that described above with respect to authentication provided by technology companies such as Microsoft Corporation, social media companies may similarly provide such authentication functionality. As a result, implementations of the phishing detection system 112 of FIG. 1 may include training: (i) an autoencoder to identify and compress into a latent representation login screen components corresponding to social media companies, and (ii) a classifying machine learning model to classify such latent representations to one of a predefined set of classes.

It is noted that while a domain may enable an individual to login to an account for the domain through authentication by a third-party, such as a technology company or social media company, the domain may provide its own authentication process and, thus, their own login screen. Therefore, just as a classifying machine learning model may be trained and configured to classify a latent representation of candidate login screen as corresponding to a well-known technology company (e.g., Microsoft Corporation), a classifying machine learning model as disclosed herein and utilized as part of the phishing detection system 112 of FIG. 1 may be trained and configured to classify a login screen as corresponding to a particular domain. Such will depend on the training data provided when training the autoencoder and the classifying machine learning model.

Still referring to FIG. 5, the process 500 subsequently includes determining that the candidate phishing webpage is a phishing webpage when the login class assigned by the classifying machine learning model does not appear on the allow list (block 510). In such instances, an alert may be generated that is transmitted to the domain owner, a particular individual if contact information is known by the phishing detection system 112 of FIG. 1 (e.g., through correlation of the URL of the phishing webpage to an email received by one or more individuals within an enterprise, internet browsing history of one or more individuals within an enterprise, etc.). A listing of phishing URLs may also be provided as part of a dashboard that is accessible by a domain owner, an individual based on known contact information, and/or an administrator such as a security operations center (SOC) analyst. FIG. 1 illustrates the provision of example alerts or dashboards. In other implementations, network traffic may be blocked that is directed to the URL indicated as being phishing, such as by a firewall of an enterprise network. Additionally, an email that included the URL indicated as being phishing may be automatically removed from a recipient's inbox, and optionally placed in a junk or spam folder. In some instances, the mail client of a recipient may be visually altered such that an email including the URL appears with a flag or other visual indicator that the email includes a phishing link.

Figure 6:
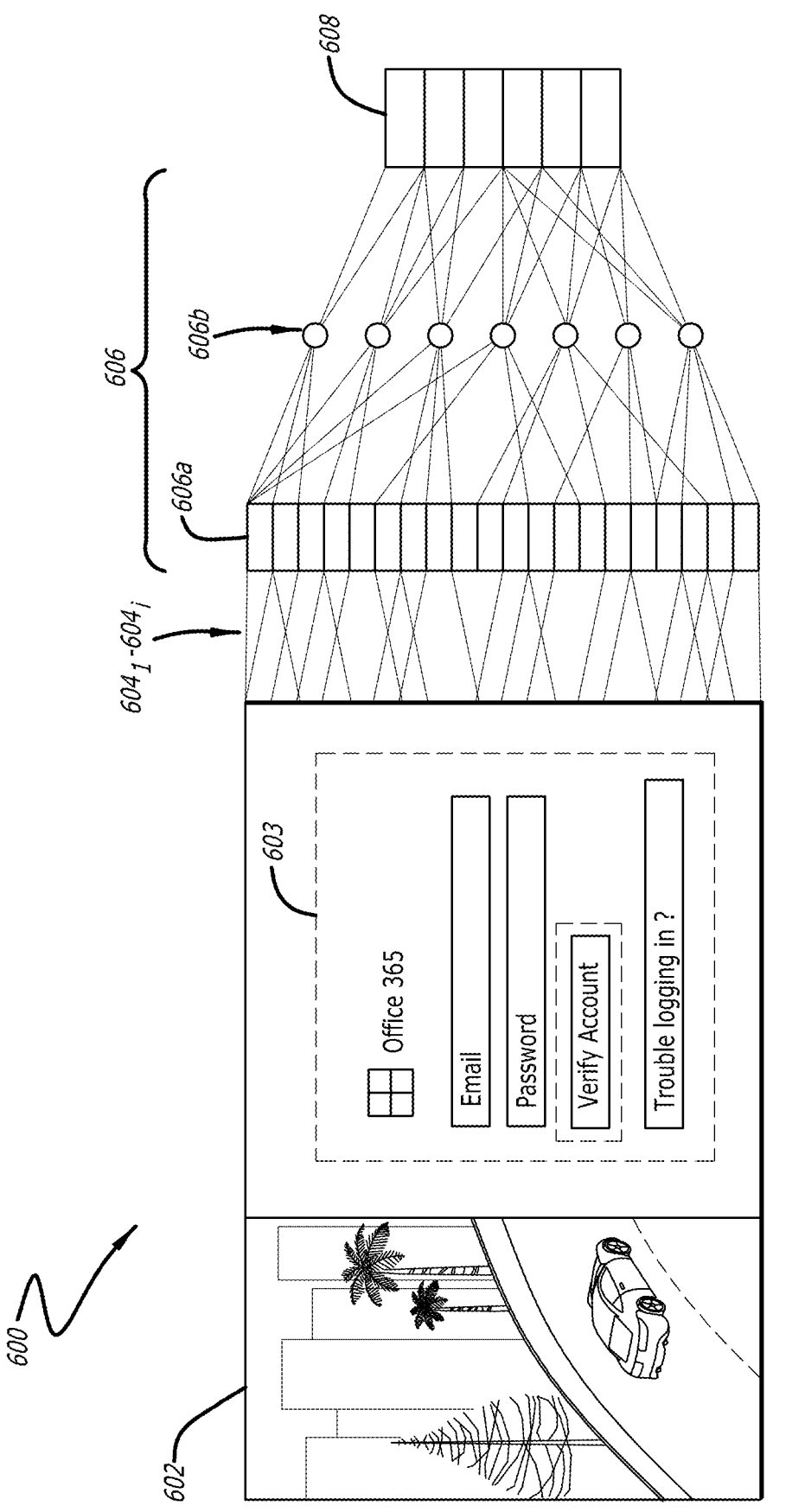
FIG. 6 is a diagrammatic flow illustrating an encoder analyzing a webpage and generating a latent representation of a login screen component of the webpage according to an implementation of the disclosure.

Referring to FIG. 6, a diagrammatic flow illustrating an encoder analyzing a webpage and generating a latent representation of a login screen component of the webpage is shown according to an implementation of the disclosure. FIG. 6 illustrates the webpage image 600 being provided to an input layer 606a of the encoder 606. In particular, the webpage image 600 includes background scenery 602 and a login screen component 603. The pixels $604_1$-$604_i$ are provided to neurons comprising the input layer 606a. In some implementations, each neuron of the input layer 606a receives an individual pixel of the webpage image 600. With respect to some implementations, the hidden layers 606b of the encoder 606 perform operations to reduce the dimensionality of the webpage image 600 as received by the input layer 606a in order to generate a latent representation 608. The hidden layers 606b may include one or more hidden layers.

In one example, a first hidden layer may perform a feature extraction process and reduce the dimension of the webpage image 606 by maintaining the extracted features and discarded pixels not pertaining to the extracted features. Second, third, etc., hidden layers continually reduce the dimension of the input data by extracting higher level features and discarded pixels of the input data. In some examples, the feature extraction and dimensionality reduction may be performed through use of an activation function, such as rectified liner unit (ReLU). Complex relationships and patterns within the input data are captured through the activation function. The processing of the hidden layers 606b results in the latent representation 608.

Figure 7:
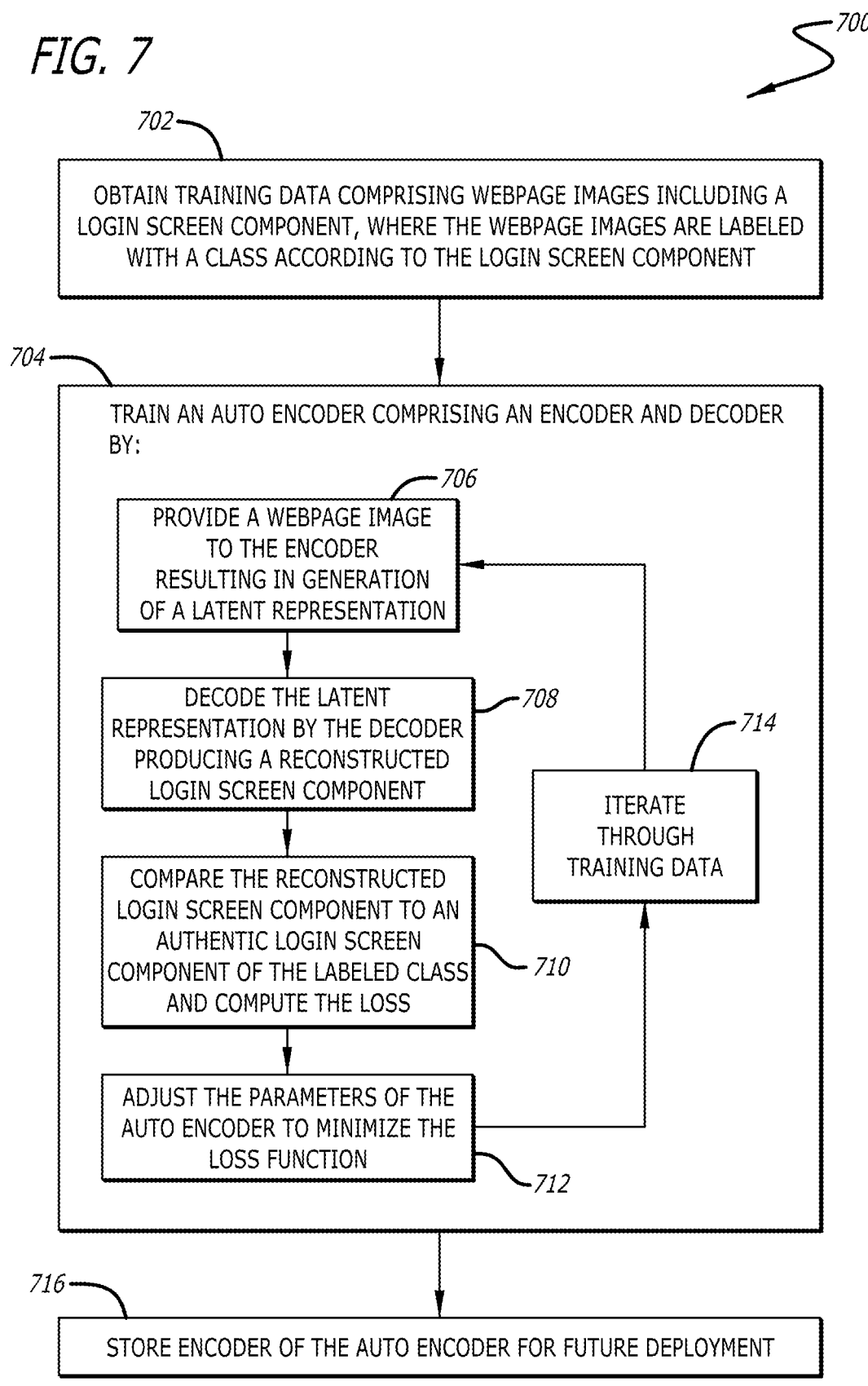
FIG. 7 is a flowchart illustrating an example process of operations for performing a training an autoencoder configured for utilization in a phishing detection methodology according to an implementation of the disclosure.

Referring now to FIG. 7, a flowchart illustrating an example process of operations for performing a training an autoencoder configured for utilization in a phishing detection methodology is shown according to an implementation of the disclosure. Each block illustrated in FIG. 7 represents an operation in the process 700 performed by, for example, the phishing detection system 112 of FIG. 1. It should be understood that not every operation illustrated in FIG. 7 is required. In fact, certain operations may be optional to complete aspects of the process 700. The discussion of the operations of process 700 may be done so with reference to any of the previously described figures.

The process 700 begins with an operation of obtaining training data comprising webpage images including a login screen component (block 702). In some instances, the webpage images are labeled with a class according to the login screen component. As discussed above, each of the predefined classes may correspond to one of a technology company, a social media company, a single sign-on provider, a particular domain, or even of known phishing attacks. Additionally, one of the predefined classes may correspond to unknown login in screen components (e.g., that do not closely correspond to any of the training data).

The process 700 continues with an iterative training process of a neural network, and specifically of an autoencoder, configured to identify a login screen component of a webpage and generate a latent representation of the login screen component (collectively, block 704). Within the block 704, several operations may be performed in an iterative manner in order to train the neural network over a plurality of data samples, i.e., webpage images, that comprise the training data. The iterative training process may include providing a first webpage image to an encoder of an autoencoder resulting in the generation of a latent representation of the login screen component (block 706). The operations of block 706 may be referred to as the encoding phase.

Importantly, the encoding phase includes an operation of identifying a login screen component of a webpage image and differentiating the login screen component from the rest of the webpage (e.g., background imagery) and generating the latent representation of the login screen component. In some implementations, the latent representation represents only the login screen component and excludes the background imagery. In some implementations, training of the encoder to identify the login screen component may be facilitated by providing labeled webpage images as training data that identify the login screen component.

The decoder is then provided with the latent representation and reconstructs the original first webpage image, which may be referred to as the decoding phase (block 708). The reconstructed first webpage image is then compared to the original first webpage image with a loss function used to measure the difference therebetween (block 710). In some examples, the loss function may be the mean squared error (MSE) function. Finally, the parameters of the encoder and decoder are updated based on the difference computed by the loss function such that the adjustment of the parameters seeks to minimize the loss function (block 712). In many implementations, an optimization algorithm may be utilized such as stochastic gradient descent (SGD). The iterative training process of block 704 repeats the operations of blocks 706-712 by iterating through the images of the training data (block 714).

In many implementations, the encoder component of the autoencoder is stored for future deployment (block 716). For example, the encoder component may be stored by the PROD container as the neural network 116.

Figure 8:
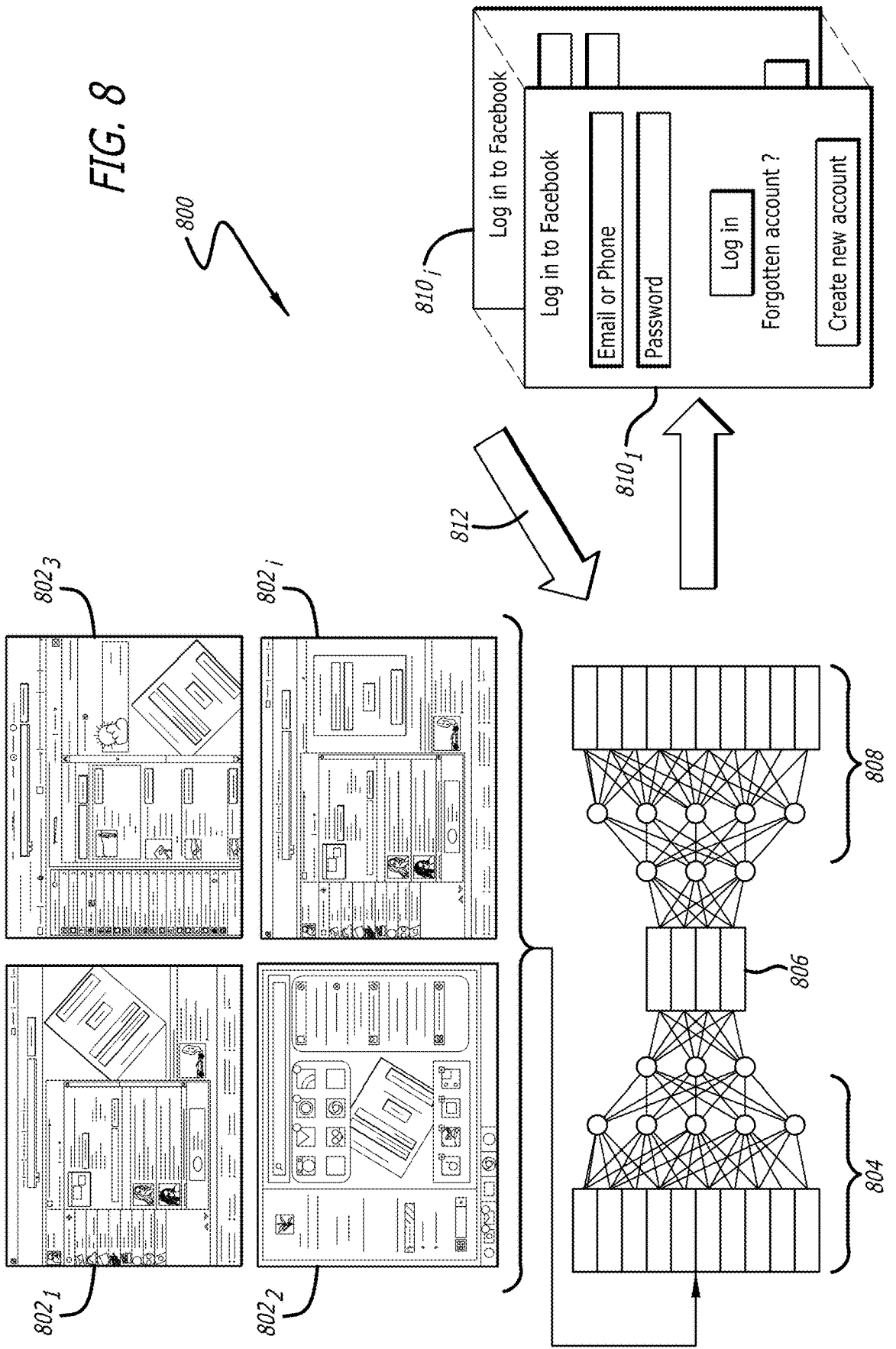
FIG. 8 is a diagrammatic flow illustrating the example process of FIG. 6 according to an implementation of the disclosure.

Referring to FIG. 8, a diagrammatic flow illustrating the example process of FIG. 7 is shown according to an implementation of the disclosure. The flow 800 illustrates that training data comprising webpage images including login screen components (images $802_1$-$802_i$) (where i>4 in the example shown) (collectively, images 802). In some implementations, the training data may include the login screen component in various locations on webpage images and/or rotated into different orientations, which forces the encoder 804 to identify the login screen component in such various locations and orientations. The images 802 are provided to the autoencoder, and specifically, an input layer of the encoder 804 during the encoding phase. One or more hidden layers then analyze each webpage image 802 to identify the login screen component and generate a latent representation 806 for each webpage image 802. The decoder 808 is then provided with each latent representation 806 and attempts to reconstruct the original login screen component $810_1$-$810_i$. As each latent representation 806 corresponds to the login screen component of each webpage image 802, the decoder 808 decodes the login screen component portion as opposed to the entire webpage image 802. As noted above in FIG. 7, the parameters of the encoder 804 and decoder 808 are adjusted following the processing of each image 802, where the parameter adjustment is noted by the arrow 812.

In some particular implementations, the autoencoder is formed of two neural networks, the encoder and decoder. In most traditional autoencoders, the encoder and decoder are symmetrical, e.g., mirror images of each other in terms of layers, neurons, and activation functions. However, in some implementations, properties of the encoder may differ from those of the decoder. In some particular implementations, the encoder and the decoder may each be formed of seven layers and utilize a rectified liner unit (ReLU) as the activation function. However, the encoder may include a linear (input) that receives a webpage image of 1024 pixels, includes a layer to flatten the webpage image, and 5 encoding (hidden) layers that reduce the dimensionality from 1024 pixels to 64. Differently, the decoder may include a 5 deconvolutional (convolutional transpose or decoding) layers and an output layer. In some implementations, the decoder may not output or reconstruct the same image of the same size as the original image provided as input to the encoder. Thus, in some instances of the disclosure, the output image reconstructed by the decoder is compared to a portion of the original input image, e.g., the subportion pertaining to the original login screen component.

Referring to FIG. 9, a flowchart illustrating an example operations for performing a phishing detection methodology is shown according to an implementation of the disclosure. The example process 900 can be implemented, for example, by a computing device that comprises a processor and a non-transitory computer-readable medium. The non-transitory computer readable medium can be storing instructions that, when executed by the processor, can cause the processor to perform the operations of the illustrated process 900. Alternatively or additionally, the process 800 can be implemented using a non-transitory computer-readable medium storing instructions that, when executed by one or more processors, case the one or more processors to perform the operations of the process 900 of FIG. 9.

Each block illustrated in FIG. 9 represents an operation in the process 900 performed by, for example, the phishing detection system 112 of FIG. 1. It should be understood that not every operation illustrated in FIG. 9 is required. In fact, certain operations may be optional to complete aspects of the process 900. The discussion of the operations of process 900 may be done so with reference to any of the previously described figures. The process 900 begins with an operation of obtaining an image of a candidate phishing webpage that includes a login screen component, wherein a login screen component includes one or more user interface (UI) elements configured to receive confidential information of an individual (block 902).

An encoder configured to take the image of the candidate phishing webpage as input is deployed to identify the login screen component within the image of the candidate phishing webpage and generate a latent representation corresponding the login screen component (block 904). Additionally, a machine learning model is deployed to classify the login screen component into one of a predefined set of classes (block 906). Following deployment of the machine learning model, a class assigned to the login screen component is correlated with an allow/deny list(s) pertaining to a domain of candidate phishing webpage and the candidate phishing webpage is identified as either a phishing webpage or a non-phishing webpage based on the correlating of the class assigned to the login screen component with the allow/deny list (blocks 908, 910).

In some implementations, the domain of the candidate phishing webpage is determined through parsing of a uniform resource locator (URL) of the candidate phishing webpage. Additionally, the candidate phishing webpage may include the login screen component and additional text or imagery, and wherein identifying the login screen component within the image of the candidate phishing webpage includes differentiating the login screen component from the additional text or imagery. In some instances, the encoder is a component of an autoencoder, wherein the autoencoder includes both the encoder and a decoder, wherein both the encoder and the decoder are separate neural networks.

In some examples, the process 900 my further include operations of training the autoencoder on training data comprising sample webpage images, wherein at least a portion of the sample webpage images include login screen components, and iteratively performing a set of operations for each of sample webpage images including: providing a first sample webpage image to the encoder resulting in generation of a first sample latent representation, decoding the first sample latent representation by the decoder thereby producing a reconstructed version of a sample login component of the first sample webpage image, comparing the reconstructed version of a sample login component of the first sample webpage image with an original version of a sample login component of the first sample webpage image resulting in computation of a loss, and adjusting a set of parameters of one or more of the encoder or the decoder based on the loss.

In some implementations, following training, the encoder is stored for subsequent deployed and the decoder is discarded. Additionally, in some examples, the layers of the encoder are asymmetrical to the layers of the decoder.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 10:
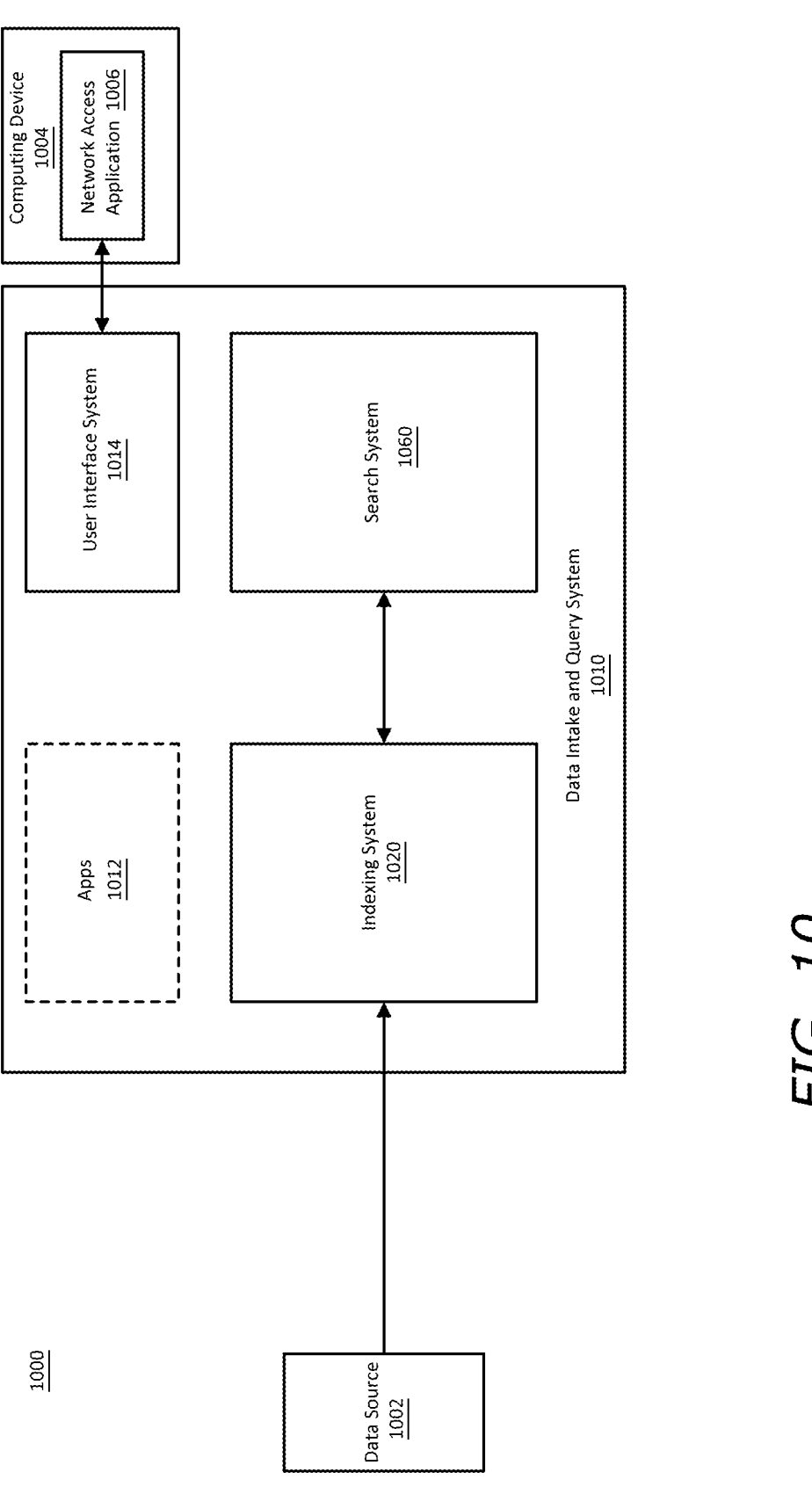
FIG. 10 is a block diagram illustrating an example computing environment that includes a data intake and query system according to an implementation of the disclosure.

FIG. 10 is a block diagram illustrating an example computing environment 1000 that includes a data intake and query system 1010. The data intake and query system 1010 obtains data from a data source 1002 in the computing environment 1000, and ingests the data using an indexing system 1020. A search system 1060 of the data intake and query system 1010 enables users to navigate the indexed data. Though drawn with separate boxes in FIG. 10, in some implementations the indexing system 1020 and the search system 1060 can have overlapping components. A computing device 1004, running a network access application 1006, can communicate with the data intake and query system 1010 through a user interface system 1014 of the data intake and query system 1010. Using the computing device 1004, a user can perform various operations with respect to the data intake and query system 1010, such as administration of the data intake and query system 1010, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1010 can further optionally include apps 1012 that extend the search, analytics, and/or visualization capabilities of the data intake and query system 1010.

The data intake and query system 1010 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1010 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1010 can be executed on a single computing device, or execution of the program code can be distributed over multiple computing devices. For example, the program code can include instructions for both indexing and search components (which may be part of the indexing system 1020 and/or the search system 1060, respectively), which can be executed on a computing device that also provides the data source 1002. As another example, the program code can be executed on one computing device, where execution of the program code provides both indexing and search components, while another copy of the program code executes on a second computing device that provides the data source 1002. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1002 of the computing environment 1000 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1002 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1020 obtains machine date from the data source 1002 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1020 does not require prior knowledge of the structure of incoming data (e.g., the indexing system 1020 does not need to be provided with a schema describing the data). Additionally, the indexing system 1020 retains a copy of the data as it was received by the indexing system 1020 such that the original data is always available for searching (e.g., no data is discarded, though, in some examples, the indexing system 1020 can be configured to do so).

The search system 1060 searches the data stored by the indexing 1020 system. As discussed in greater detail below, the search system 1060 enables users associated with the computing environment 1000 (and possibly also other users) to navigate the data, generate reports, and visualize search results in "dashboards" output using a graphical interface. Using the facilities of the search system 1060, users can obtain insights about the data, such as retrieving events from an index, calculating metrics, searching for specific conditions within a rolling time window, identifying patterns in the data, and predicting future trends, among other examples. To achieve greater efficiency, the search system 1060 can apply map-reduce methods to parallelize searching of large volumes of data. Additionally, because the original data is available, the search system 1060 can apply a schema to the data at search time. This allows different structures to be applied to the same data, or for the structure to be modified if or when the content of the data changes. Application of a schema at search time may be referred to herein as a late-binding schema technique.

The user interface system 1014 provides mechanisms through which users associated with the computing environment 1000 (and possibly others) can interact with the data intake and query system 1010. These interactions can include configuration, administration, and management of the indexing system 1020, initiation and/or scheduling of queries that are to be processed by the search system 1060, receipt or reporting of search results, and/or visualization of search results. The user interface system 1014 can include, for example, facilities to provide a command line interface or a web-based interface.

Users can access the user interface system 1014 using a computing device 1004 that communicates with data intake and query system 1010, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1000. For example, a person can log in as a particular user and, using the user's digital information, can access the data intake and query system 1010. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1004 can provide a human-machine interface through which a person can have a digital presence in the computing environment 1000 in the form of a user. The computing device 1004 is an electronic device having one or more processors and a memory capable of storing instructions for execution by the one or more processors. The computing device 1004 can further include input/output (I/O) hardware and a network interface. Applications executed by the computing device 1004 can include a network access application 1006, such as a web browser, which can use a network interface of the client computing device 1004 to communicate, over a network, with the user interface system 1014 of the data intake and query system 1010. The user interface system 1014 can use the network access application 1006 to generate user interfaces that enable a user to interact with the data intake and query system 1010. A web browser is one example of a network access application. A shell tool can also be used as a network access application. In some examples, the data intake and query system 1010 is an application executing on the computing device 1006. In such examples, the network access application 1006 can access the user interface system 1014 without going over a network.

The data intake and query system 1010 can optionally include apps 1012. An app of the data intake and query system 1010 is a collection of configurations, knowledge objects (a user-defined entity that enriches the data in the data intake and query system 1010), views, and dashboards that may provide additional functionality, different techniques for searching the data, and/or additional insights into the data. The data intake and query system 1010 can execute multiple applications simultaneously. Example applications include an information technology service intelligence application, which can monitor and analyze the performance and behavior of the computing environment 1000, and an enterprise security application, which can include content and searches to assist security analysts in diagnosing and acting on anomalous or malicious behavior in the computing environment 1000.

Though FIG. 10 illustrates only one data source, in practical implementations, the computing environment 1000 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1000, the data intake and query system 1010 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1000 can include on-prem and cloud-based computing resources, or only cloud-based resources. For example, an entity may have on-prem computing devices and a private cloud. In this example, the entity operates the data intake and query system 1010 and can choose to execute the data intake and query system 1010 on an on-prem computing device or in the cloud. In another example, a provider entity operates the data intake and query system 1010 in a public cloud and provides the functionality of the data intake and query system 1010 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1010. In some implementations, the entity providing the data intake and query system 1010 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1010, and a third entity can subscribe to the services of the second provider entity in order to use the functionality of the data intake and query system 1010. In this example, the data sources are associated with the third entity, users accessing the data intake and query system 1010 are associated with the third entity, and the analytics and insights provided by the data intake and query system 1010 are for purposes of the third entity's operations.

Figure 11:
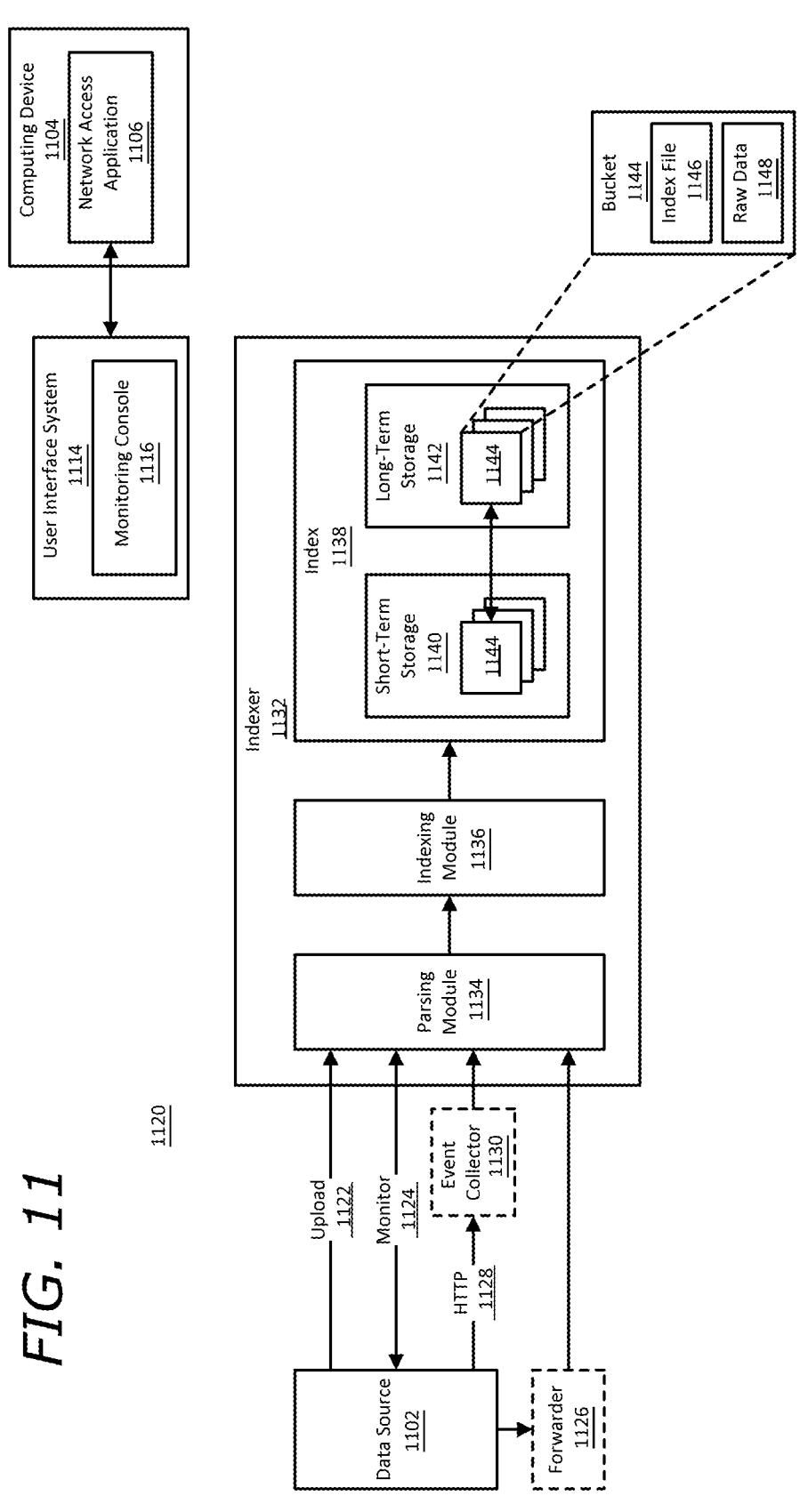
FIG. 11 is a block diagram illustrating in greater detail an example of an indexing system of a data intake and query system, such as the data intake and query system of FIG. 10 according to an implementation of the disclosure.

FIG. 11 is a block diagram illustrating in greater detail an example of an indexing system 1120 of a data intake and query system, such as the data intake and query system 1010 of FIG. 10. The indexing system 1120 of FIG. 11 uses various methods to obtain machine data from a data source 1102 and stores the data in an index 1138 of an indexer 1132. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1120 enables the data intake and query system to obtain the machine data produced by the data source 1102 and to store the data for searching and retrieval.

Users can administer the operations of the indexing system 1120 using a computing device 1104 that can access the indexing system 1120 through a user interface system 1114 of the data intake and query system. For example, the computing device 1104 can be executing a network access application 1106, such as a web browser or a terminal, through which a user can access a monitoring console 1116 provided by the user interface system 1114. The monitoring console 1116 can enable operations such as: identifying the data source 1102 for data ingestion; configuring the indexer 1132 to index the data from the data source 1132; configuring a data ingestion method; configuring, deploying, and managing clusters of indexers; and viewing the topology and performance of a deployment of the data intake and query system, among other operations. The operations performed by the indexing system 1120 may be referred to as "index time" operations, which are distinct from "search time" operations that are discussed further below.

The indexer 1132, which may be referred to herein as a data indexing component, coordinates and performs most of the index time operations. The indexer 1132 can be implemented using program code that can be executed on a computing device. The program code for the indexer 1132 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1132. In some implementations, the indexer 1132 executes on the computing device 1104 through which a user can access the indexing system 1120. In some implementations, the indexer 1132 executes on a different computing device than the illustrated computing device 1104.

The indexer 1132 may be executing on the computing device that also provides the data source 1102 or may be executing on a different computing device. In implementations wherein the indexer 1132 is on the same computing device as the data source 1102, the data produced by the data source 1102 may be referred to as "local data." In other implementations the data source 1102 is a component of a first computing device and the indexer 1132 executes on a second computing device that is different from the first computing device. In these implementations, the data produced by the data source 1102 may be referred to as "remote data." In some implementations, the first computing device is "on-prem" and in some implementations the first computing device is "in the cloud." In some implementations, the indexer 1132 executes on a computing device in the cloud and the operations of the indexer 1132 are provided as a service to entities that subscribe to the services provided by the data intake and query system.

For a given data produced by the data source 1102, the indexing system 1120 can be configured to use one of several methods to ingest the data into the indexer 1132. These methods include upload 1122, monitor 1124, using a forwarder 1126, or using HyperText Transfer Protocol (HTTP 1128) and an event collector 1130. These and other methods for data ingestion may be referred to as "getting data in" (GDI) methods.

Using the upload 1122 method, a user can specify a file for uploading into the indexer 1132. For example, the monitoring console 1116 can include commands or an interface through which the user can specify where the file is located (e.g., on which computing device and/or in which directory of a file system) and the name of the file. The file may be located at the data source 1102 or may be on the computing device where the indexer 1132 is executing. Once uploading is initiated, the indexer 1132 processes the file, as discussed further below. Uploading is a manual process and occurs when instigated by a user. For automated data ingestion, the other ingestion methods are used.

The monitor 1124 method enables the indexing system 1102 to monitor the data source 1102 and continuously or periodically obtain data produced by the data source 1102 for ingestion by the indexer 1132. For example, using the monitoring console 1116, a user can specify a file or directory for monitoring. In this example, the indexing system 1102 can execute a monitoring process that detects whenever the file or directory is modified and causes the file or directory contents to be sent to the indexer 1132. As another example, a user can specify a network port for monitoring. In this example, a monitoring process can capture data received at or transmitting from the network port and cause the data to be sent to the indexer 1132. In various examples, monitoring can also be configured for data sources such as operating system event logs, performance data generated by an operating system, operating system registries, operating system directory services, and other data sources.

Monitoring is available when the data source 1102 is local to the indexer 1132 (e.g., the data source 1102 is on the computing device where the indexer 1132 is executing). Other data ingestion methods, including forwarding and the event collector 1130, can be used for either local or remote data sources.

A forwarder 1126, which may be referred to herein as a data forwarding component, is a software process that sends data from the data source 1102 to the indexer 1132. The forwarder 1126 can be implemented using program code that can be executed on the computer device that provides the data source 1102. A user launches the program code for the forwarder 1126 on the computing device that provides the data source 1102. The user can further configure the forwarder 1126, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1126 can provide various capabilities. For example, the forwarder 1126 can send the data unprocessed or can perform minimal processing on the data before sending the data to the indexer 1132. Minimal processing can include, for example, adding metadata tags to the data to identify a source, source type, and/or host, among other information, dividing the data into blocks, and/or applying a timestamp to the data. In some implementations, the forwarder 1126 can break the data into individual events (event generation is discussed further below) and send the events to a receiver. Other operations that the forwarder 1126 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1130 provides an alternate method for obtaining data from the data source 1102. The event collector 1130 enables data and application events to be sent to the indexer 1132 using HTTP 1128. The event collector 1130 can be implemented using program code that can be executing on a computing device. The program code may be a component of the data intake and query system or can be a standalone component that can be executed independently of the data intake and query system and operates in cooperation with the data intake and query system.

To use the event collector 1130, a user can, for example using the monitoring console 1116 or a similar interface provided by the user interface system 1114, enable the event collector 1130 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1102 as an alternative method to using a username and password for authentication.

To send data to the event collector 1130, the data source 1102 is supplied with a token and can then send HTTP 1128 requests to the event collector 1130. To send HTTP 1128 requests, the data source 1102 can be configured to use an HTTP client and/or to use logging libraries such as those supplied by Java, JavaScript, and .NET libraries. An HTTP client enables the data source 1102 to send data to the event collector 1130 by supplying the data, and a Uniform Resource Identifier (URI) for the event collector 1130 to the HTTP client. The HTTP client then handles establishing a connection with the event collector 1130, transmitting a request containing the data, closing the connection, and receiving an acknowledgment if the event collector 1130 sends one. Logging libraries enable HTTP 1128 requests to the event collector 1130 to be generated directly by the data source. For example, an application can include or link a logging library, and through functionality provided by the logging library manage establishing a connection with the event collector 1130, transmitting a request, and receiving an acknowledgement.

An HTTP 1128 request to the event collector 1130 can contain a token, a channel identifier, event metadata, and/or event data. The token authenticates the request with the event collector 1130. The channel identifier, if available in the indexing system 1120, enables the event collector 1130 to segregate and keep separate data from different data sources. The event metadata can include one or more key-value pairs that describe the data source 1102 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1130 extracts events from HTTP 1128 requests and sends the events to the indexer 1132. The event collector 1130 can further be configured to send events to one or more indexers. Extracting the events can include associating any metadata in a request with the event or events included in the request. In these implementations, event generation by the indexer 1132 (discussed further below) is bypassed, and the indexer 1132 moves the events directly to indexing. In some implementations, the event collector 1130 extracts event data from a request and outputs the event data to the indexer 1132, and the indexer generates events from the event data. In some implementations, the event collector 1130 sends an acknowledgement message to the data source 1102 to indicate that the event collector 1130 has received a particular request form the data source 1102, and/or to indicate to the data source 1102 that events in the request have been added to an index.

The indexer 1132 ingests incoming data and transforms the data into searchable knowledge in the form of events. In the data intake and query system, an event is a single piece of data that represents activity of the component represented in FIG. 11 by the data source 1102. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1132 can include a parsing module 1134 and an indexing module 1136 for generating and storing the events. The parsing module 1134 and indexing module 1136 can be modular and pipelined, such that one component can be operating on a first set of data while the second component is simultaneously operating on a second sent of data. Additionally, the indexer 1132 may at any time have multiple instances of the parsing module 1134 and indexing module 1136, with each set of instances configured to simultaneously operate on data from the same data source or from different data sources. The parsing module 1134 and indexing module 1136 are illustrated in FIG. 11 to facilitate discussion, with the understanding that implementations with other components are possible to achieve the same functionality.

The parsing module 1134 determines information about incoming event data, where the information can be used to identify events within the event data. For example, the parsing module 1134 can associate a source type with the event data. A source type identifies the data source 1102 and describes a possible data structure of event data produced by the data source 1102. For example, the source type can indicate which fields to expect in events generated at the data source 1102 and the keys for the values in the fields, and possibly other information such as sizes of fields, an order of the fields, a field separator, and so on. The source type of the data source 1102 can be specified when the data source 1102 is configured as a source of event data. Alternatively, the parsing module 1134 can determine the source type from the event data, for example from an event field in the event data or using machine learning techniques applied to the event data.

Other information that the parsing module 1134 can determine includes timestamps. In some cases, an event includes a timestamp as a field, and the timestamp indicates a point in time when the action represented by the event occurred or was recorded by the data source 1102 as event data. In these cases, the parsing module 1134 may be able to determine from the source type associated with the event data that the timestamps can be extracted from the events themselves. In some cases, an event does not include a timestamp and the parsing module 1134 determines a timestamp for the event, for example from a name associated with the event data from the data source 1102 (e.g., a file name when the event data is in the form of a file) or a time associated with the event data (e.g., a file modification time). As another example, when the parsing module 1134 is not able to determine a timestamp from the event data, the parsing module 1134 may use the time at which it is indexing the event data. As another example, the parsing module 1134 can use a user-configured rule to determine the timestamps to associate with events.

The parsing module 1134 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1134 may be able to determine event boundaries from the source type associated with the event data, for example from a data structure indicated by the source type. In some implementations, a user can configure rules the parsing module 1134 can use to identify event boundaries.

The parsing module 1134 can further extract data from events and possibly also perform transformations on the events. For example, the parsing module 1134 can extract a set of fields (key-value pairs) for each event, such as a host or hostname, source or source name, and/or source type. The parsing module 1134 may extract certain fields by default or based on a user configuration. Alternatively or additionally, the parsing module 1134 may add fields to events, such as a source type or a user-configured field. As another example of a transformation, the parsing module 1134 can anonymize fields in events to mask sensitive information, such as social security numbers or account numbers. Anonymizing fields can include changing or replacing values of specific fields. The parsing component 1134 can further perform user-configured transformations.

The parsing module 1134 outputs the results of processing incoming event data to the indexing module 1136, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1132 can be configured to identify searchable segments that are parts of fields, searchable segments that are entire fields, or both. The parsing module 1134 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1146, to find event data that matches a search query. In some implementations, segmentation can alternatively be performed by the forwarder 1126. Segmentation can also be disabled, in which case the indexer 1132 will not build a lexicon for the event data. When segmentation is disabled, the search system searches the event data directly.

Building index data structures generates the index 1138. The index 1138 is a storage data structure on a storage device (e.g., a disk drive or other physical device for storing digital data). The storage device may be a component of the computing device on which the indexer 1132 is operating (referred to herein as local storage) or may be a component of a different computing device (referred to herein as remote storage) that the indexer 1138 has access to over a network. The indexer 1132 can manage more than one index and can manage indexes of different types. For example, the indexer 1132 can manage event indexes, which impose minimal structure on stored data and can accommodate any type of data. As another example, the indexer 1132 can manage metrics indexes, which use a highly structured format to handle the higher volume and lower latency demands associated with metrics data.

The indexing module 1136 organizes files in the index 1138 in directories referred to as buckets. The files in a bucket 1144 can include raw data files, index files, and possibly also other metadata files. As used herein, "raw data" means data as when the data was produced by the data source 1102, without alteration to the format or content. As noted previously, the parsing component 1134 may add fields to event data and/or perform transformations on fields in the event data. Event data that has been altered in this way is referred to herein as enriched data. A raw data file 1148 can include enriched data, in addition to or instead of raw data. The raw data file 1148 may be compressed to reduce disk usage. An index file 1146, which may also be referred to herein as a "time-series index" or tsidx file, contains metadata that the indexer 1132 can use to search a corresponding raw data file 1148. As noted above, the metadata in the index file 1146 includes a lexicon of the event data, which associates each unique keyword in the event data with a reference to the location of event data within the raw data file 1148. The keyword data in the index file 1146 may also be referred to as an inverted index. In various implementations, the data intake and query system can use index files for other purposes, such as to store data summarizations that can be used to accelerate searches.

A bucket 1144 includes event data for a particular range of time. The indexing module 1136 arranges buckets in the index 1138 according to the age of the buckets, such that buckets for more recent ranges of time are stored in short-term storage 1140 and buckets for less recent ranges of time are stored in long-term storage 1142. Short-term storage 1140 may be faster to access while long-term storage 1142 may be slower to access. Buckets may be moves from short-term storage 1140 to long-term storage 1142 according to a configurable data retention policy, which can indicate at what point in time a bucket is old enough to be moved.

A bucket's location in short-term storage 1140 or long-term storage 1142 can also be indicated by the bucket's status. As an example, a bucket's status can be "hot," "warm," "cold," "frozen," or "thawed." In this example, hot bucket is one to which the indexer 1132 is writing data and the bucket becomes a warm bucket when the index 1132 stops writing data to it. In this example, both hot and warm buckets reside in short-term storage 1140. Continuing this example, when a warm bucket is moved to long-term storage 1142, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1120 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1120 through the monitoring console 1116 provided by the user interface system 1114. Using the monitoring console 1116, the user can configure and monitor an index cluster, and see information such as disk usage by an index, volume usage by an indexer, index and volume size over time, data age, statistics for bucket types, and bucket settings, among other information.

Figure 12:
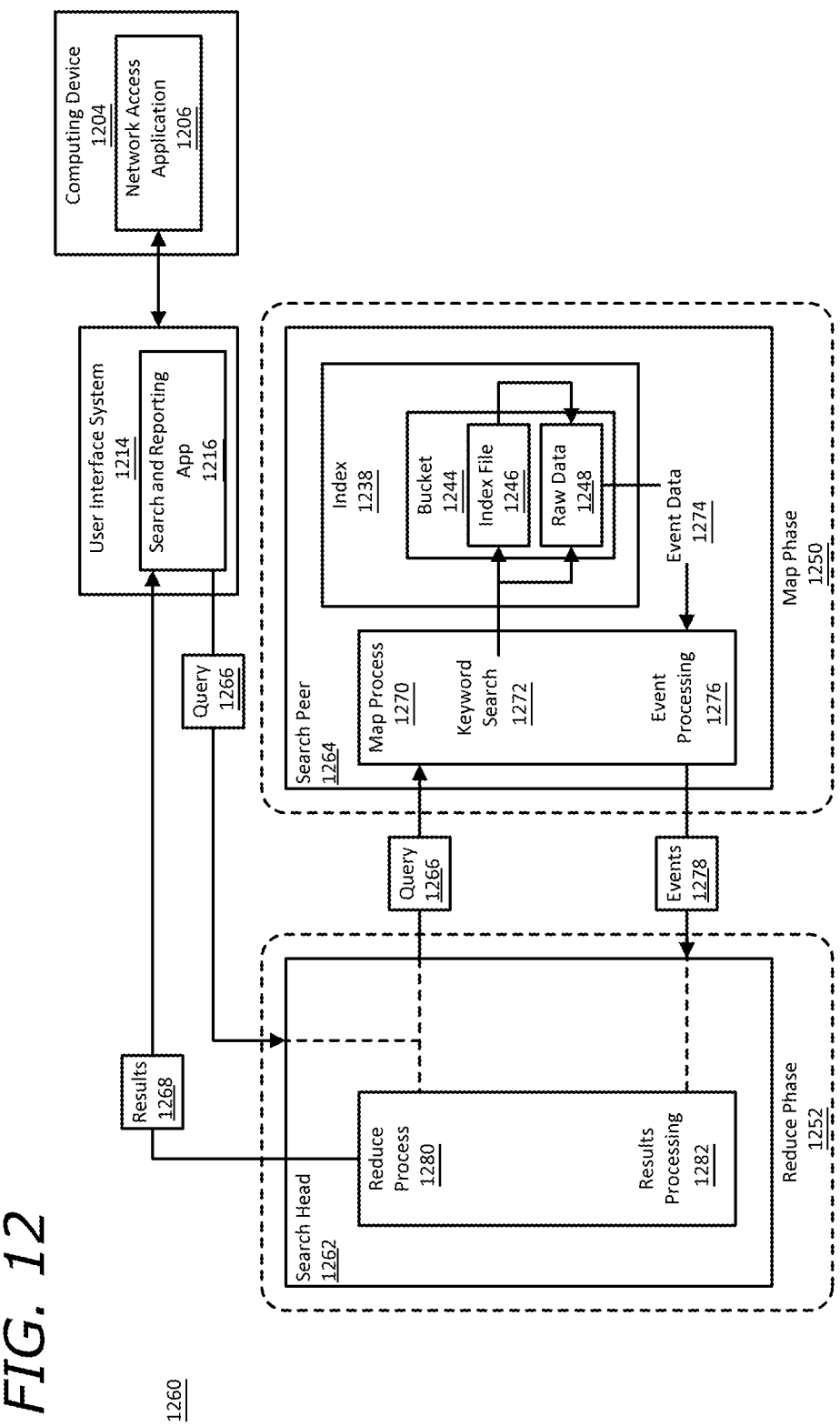
FIG. 12 is a block diagram illustrating in greater detail an example of the search system of a data intake and query system, such as the data intake and query system of FIG. 10 according to an implementation of the disclosure.

FIG. 12 is a block diagram illustrating in greater detail an example of the search system 1260 of a data intake and query system, such as the data intake and query system 1010 of FIG. 10. The search system 1260 of FIG. 12 issues a query 1266 to a search head 1262, which sends the query 1266 to a search peer 1264. Using a map process 1270, the search peer 1264 searches the appropriate index 1238 for events identified by the query 1266 and sends events 1278 so identified back to the search head 1262. Using a reduce process 1282, the search head 1262 processes the events 1278 and produces results 1268 to respond to the query 1266. The results 1268 can provide useful insights about the data stored in the index 1238. These insights can aid in the administration of information technology systems, in security analysis of information technology systems, and/or in analysis of the development environment provided by information technology systems.

The query 1266 that initiates a search is produced by a search and reporting app 1216 that is available through the user interface system 1214 of the data intake and query system. Using a network access application 1206 executing on a computing device 1204, a user can input the query 1266 into a search field provided by the search and reporting app 1216. Alternatively or additionally, the search and reporting app 1216 can include pre-configured queries or stored queries that can be activated by the user. In some cases, the search and reporting app 1216 initiates the query 1266 when the user enters the query 1266. In these cases, the query 1266 may be referred to as an "ad-hoc" query. In some cases, the search and reporting app 1216 initiates the query 1266 based on a schedule. For example, the search and reporting app 1216 can be configured to execute the query 1266 once per hour, once per day, at a specific time, on a specific date, or at some other time that can be specified by a date, time, and/or frequency. These types of queries may be referred to as scheduled queries.

The query 1266 is specified using a search processing language. The search processing language includes commands or search terms that the search peer 1264 will use to identify events to return in the search results 1268. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1266 to include sequential commands, where a subsequent command may operate on the results of a prior command. As an example, sequential commands may be separated in the query 1266 by a vertical line ("|" or "pipe") symbol.

In addition to one or more search commands, the query 1266 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1266 occurs in two broad phases: a map phase 1250 and a reduce phase 1252. The map phase 1250 takes place across one or more search peers. In the map phase 1250, the search peers locate event data that matches the search terms in the search query 1266 and sorts the event data into field-value pairs. When the map phase 1250 is complete, the search peers send events that they have found to one or more search heads for the reduce phase 1252. During the reduce phase 1252, the search heads process the events through commands in the search query 1266 and aggregate the events to produce the final search results 1268.

A search head, such as the search head 1262 illustrated in FIG. 12, is a component of the search system 1260 that manages searches. The search head 1262, which may also be referred to herein as a search management component, can be implemented using program code that can be executed on a computing device. The program code for the search head 1262 can be stored on a non-transitory computer-readable medium and from this medium can be loaded or copied to the memory of a computing device. One or more hardware processors of the computing device can read the program code from the memory and execute the program code in order to implement the operations of the search head 1262.

Upon receiving the search query 1266, the search head 1262 directs the query 1266 to one or more search peers, such as the search peer 1264 illustrated in FIG. 12. "Search peer" is an alternate name for "indexer" and a search peer may be largely similar to the indexer described previously. The search peer 1264 may be referred to as a "peer node" when the search peer 1264 is part of an indexer cluster. The search peer 1264, which may also be referred to as a search execution component, can be implemented using program code that can be executed on a computing device. In some implementations, one set of program code implements both the search head 1262 and the search peer 1264 such that the search head 1262 and the search peer 1264 form one component. In some implementations, the search head 1262 is an independent piece of code that performs searching and no indexing functionality. In these implementations, the search head 1262 may be referred to as a dedicated search head.

The search head 1262 may consider multiple criteria when determining whether to send the query 1266 to the particular search peer 1264. For example, the search system 1260 may be configured to include multiple search peers that each have duplicative copies of at least some of the event data and are implanted using different hardware resources q. In this example, the sending the search query 1266 to more than one search peer allows the search system 1260 to distribute the search workload across different hardware resources. As another example, search system 1260 may include different search peers for different purposes (e.g., one has an index storing a first type of data or from a first data source while a second has an index storing a second type of data or from a second data source). In this example, the search query 1266 may specify which indexes to search, and the search head 1262 will send the query 1266 to the search peers that have those indexes.

To identify events 1278 to send back to the search head 1262, the search peer 1264 performs a map process 1270 to obtain event data 1274 from the index 1238 that is maintained by the search peer 1264. During a first phase of the map process 1270, the search peer 1264 identifies buckets that have events that are described by the time indicator in the search query 1266. As noted above, a bucket contains events whose timestamps fall within a particular range of time. For each bucket 1244 whose events can be described by the time indicator, during a second phase of the map process 1270, the search peer 1264 performs a keyword search 1274 using search terms specified in the search query 1266. The search terms can be one or more of keywords, phrases, fields, Boolean expressions, and/or comparison expressions that in combination describe events being searched for. When segmentation is enabled at index time, the search peer 1264 performs the keyword search 1272 on the bucket's index file 1246. As noted previously, the index file 1246 includes a lexicon of the searchable terms in the events stored in the bucket's raw data 1248 file. The keyword search 1272 searches the lexicon for searchable terms that correspond to one or more of the search terms in the query 1266. As also noted above, the lexicon incudes, for each searchable term, a reference to each location in the raw data 1248 file where the searchable term can be found. Thus, when the keyword search identifies a searchable term in the index file 1246 that matches a search term in the query 1266, the search peer 1264 can use the location references to extract from the raw data 1248 file the event data 1274 for each event that include the searchable term.

In cases where segmentation was disabled at index time, the search peer 1264 performs the keyword search 1272 directly on the raw data 1248 file. To search the raw data 1248, the search peer 1264 may identify searchable segments in events in a similar manner as when the data was indexed. Thus, depending on how the search peer 1264 is configured, the search peer 1264 may look at event fields and/or parts of event fields to determine whether an event matches the query 1266. Any matching events can be added to the event data 1274 read from the raw data 1248 file. The search peer 1264 can further be configured to enable segmentation at search time, so that searching of the index 1238 causes the search peer 1264 to build a lexicon in the index file 1246.

The event data 1274 obtained from the raw data 1248 file includes the full text of each event found by the keyword search 1272. During a third phase of the map process 1270, the search peer 1264 performs event processing 1276 on the event data 1274, with the steps performed being determined by the configuration of the search peer 1264 and/or commands in the search query 1266. For example, the search peer 1264 can be configured to perform field discovery and field extraction. Field discovery is a process by which the search peer 1264 identifies and extracts key-value pairs from the events in the event data 1274. The search peer 1264 can, for example, be configured to automatically extract the first 100 fields (or another number of fields) in the event data 1274 that can be identified as key-value pairs. As another example, the search peer 1264 can extract any fields explicitly mentioned in the search query 1266. The search peer 1264 can, alternatively or additionally, be configured with particular field extractions to perform.

Other examples of steps that can be performed during event processing 1276 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1264 sends processed events 1278 to the search head 1262, which performs a reduce process 1280. The reduce process 1280 potentially receives events from multiple search peers and performs various results processing 1282 steps on the received events. The results processing 1282 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1282 can further include applying commands from the search query 1266 to the events. The query 1266 can include, for example, commands for evaluating and/or manipulating fields (e.g., to generate new fields from existing fields or parse fields that have more than one value). As another example, the query 1266 can include commands for calculating statistics over the events, such as counts of the occurrences of fields, or sums, averages, ranges, and so on, of field values. As another example, the query 1266 can include commands for generating statistical values for purposes of generating charts of graphs of the events.

The reduce process 1280 outputs the events found by the search query 1266, as well as information about the events. The search head 1262 transmits the events and the information about the events as search results 1268, which are received by the search and reporting app 1216. The search and reporting app 1216 can generate visual interfaces for viewing the search results 1268. The search and reporting app 1216 can, for example, output visual interfaces for the network access application 1206 running on a computing device 1204 to generate.

The visual interfaces can include various visualizations of the search results 1268, such as tables, line or area charts, Choropleth maps, or single values. The search and reporting app 1216 can organize the visualizations into a dashboard, where the dashboard includes a panel for each visualization. A dashboard can thus include, for example, a panel listing the raw event data for the events in the search results 1268, a panel listing fields extracted at index time and/or found through field discovery along with statistics for those fields, and/or a timeline chart indicating how many events occurred at specific points in time (as indicated by the timestamps associated with each event). In various implementations, the search and reporting app 1216 can provide one or more default dashboards. Alternatively or additionally, the search and reporting app 1216 can include functionality that enables a user to configure custom dashboards.

The search and reporting app 1216 can also enable further investigation into the events in the search results 1216. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1266. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 13:
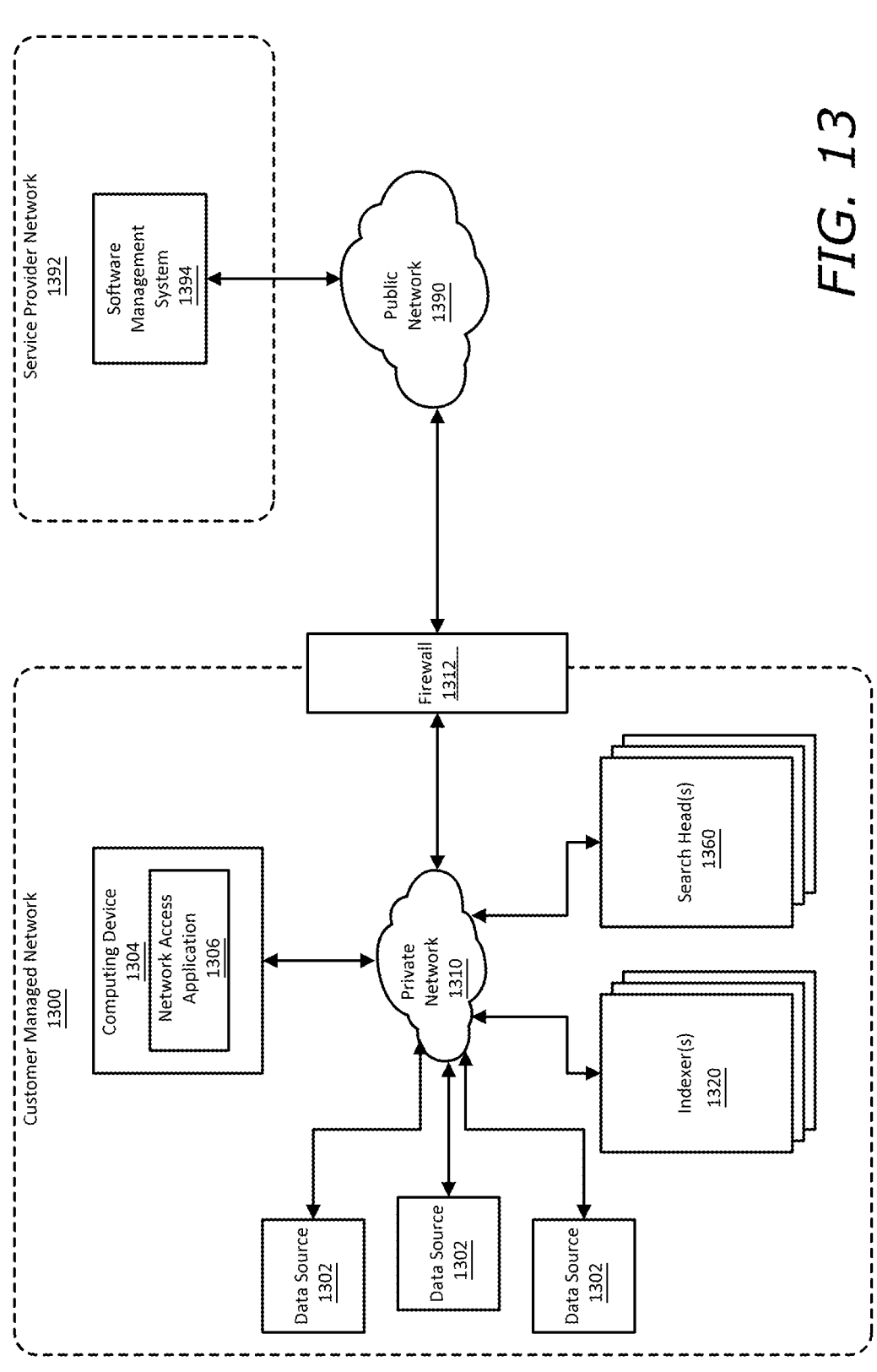
FIG. 13 illustrates an example of a self-managed network 1300 that includes a data intake and query system according to an implementation of the disclosure.

FIG. 13 illustrates an example of a self-managed network 1300 that includes a data intake and query system. "Self-managed" in this instance means that the entity that is operating the self-managed network 1300 configures, administers, maintains, and/or operates the data intake and query system using its own compute resources and people. Further, the self-managed network 1300 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1300 is located within the customer's on-prem environment, such as in the entity's data center, the operation and management of the self-managed network 1300, including of the resources in the self-managed network 1300, is under the control of the entity. For example, administrative personnel of the entity have complete access to and control over the configuration, management, and security of the self-managed network 1300 and its resources.

The self-managed network 1300 can execute one or more instances of the data intake and query system. An instance of the data intake and query system may be executed by one or more computing devices that are part of the self-managed network 1300. A data intake and query system instance can comprise an indexing system and a search system, where the indexing system includes one or more indexers 1320 and the search system includes one or more search heads 1360.

As depicted in FIG. 13, the self-managed network 1300 can include one or more data sources 1302. Data received from these data sources may be processed by an instance of the data intake and query system within self-managed network 1300. The data sources 1302 and the data intake and query system instance can be communicatively coupled to each other via a private network 1310.

Users associated with the entity can interact with and avail themselves of the functions performed by a data intake and query system instance using computing devices. As depicted in FIG. 13, a computing device 1304 can execute a network access application 1306 (e.g., a web browser), that can communicate with the data intake and query system instance and with data sources 1302 via the private network 1310. Using the computing device 1304, a user can perform various operations with respect to the data intake and query system, such as management and administration of the data intake and query system, generation of knowledge objects, and other functions. Results generated from processing performed by the data intake and query system instance may be communicated to the computing device 1304 and output to the user via an output system (e.g., a screen) of the computing device 1304.

The self-managed network 1300 can also be connected to other networks that are outside the entity's on-premise environment/network, such as networks outside the entity's data center. Connectivity to these other external networks is controlled and regulated through one or more layers of security provided by the self-managed network 1300. One or more of these security layers can be implemented using firewalls 1312. The firewalls 1312 form a layer of security around the self-managed network 1300 and regulate the transmission of traffic from the self-managed network 1300 to the other networks and from these other networks to the self-managed network 1300.

Networks external to the self-managed network can include various types of networks including public networks 1390, other private networks, and/or cloud networks provided by one or more cloud service providers. An example of a public network 1390 is the Internet. In the example depicted in FIG. 13, the self-managed network 1300 is connected to a service provider network 1392 provided by a cloud service provider via the public network 1390.

In some implementations, resources provided by a cloud service provider may be used to facilitate the configuration and management of resources within the self-managed network 1300. For example, configuration and management of a data intake and query system instance in the self-managed network 1300 may be facilitated by a software management system 1394 operating in the service provider network 1392. There are various ways in which the software management system 1394 can facilitate the configuration and management of a data intake and query system instance within the self-managed network 1300. As one example, the software management system 1394 may facilitate the download of software including software updates for the data intake and query system. In this example, the software management system 1394 may store information indicative of the versions of the various data intake and query system instances present in the self-managed network 1300. When a software patch or upgrade is available for an instance, the software management system 1394 may inform the self-managed network 1300 of the patch or upgrade. This can be done via messages communicated from the software management system 1394 to the self-managed network 1300.

The software management system 1394 may also provide simplified ways for the patches and/or upgrades to be downloaded and applied to the self-managed network 1300. For example, a message communicated from the software management system 1394 to the self-managed network 1300 regarding a software upgrade may include a Uniform Resource Identifier (URI) that can be used by a system administrator of the self-managed network 1300 to download the upgrade to the self-managed network 1300. In this manner, management resources provided by a cloud service provider using the service provider network 1392 and which are located outside the self-managed network 1300 can be used to facilitate the configuration and management of one or more resources within the entity's on-prem environment. In some implementations, the download of the upgrades and patches may be automated, whereby the software management system 1394 is authorized to, upon determining that a patch is applicable to a data intake and query system instance inside the self-managed network 1300, automatically communicate the upgrade or patch to self-managed network 1300 and cause it to be installed within self-managed network 1300.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/ steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
   obtaining an image of a candidate phishing webpage that includes a login screen component, wherein a login screen component includes one or more user interface (UI) elements configured to receive confidential information of an individual;
   deploying an encoder configured to take the image of the candidate phishing webpage as input, identify the login screen component within the image of the candidate phishing webpage and generate a latent representation corresponding the login screen component, wherein the encoder is a neural network that includes an input layer that receive the image of the candidate phishing webpage and one or more hidden layers that reduce a dimensionality of the image of the candidate phishing webpage resulting in the latent representation;
   deploying a machine learning model trained and configured to classify the login screen component into one of a predefined set of classes through analysis of the latent representation corresponding the login screen component;
   correlating a class assigned to the login screen component with an allow/deny list pertaining to a domain of the candidate phishing webpage; and
   identifying the candidate phishing webpage as either a phishing webpage or a non-phishing webpage based on the correlating of the class assigned to the login screen component with the allow/deny list.

2. The computer-implemented method of claim 1, wherein the domain of the candidate phishing webpage is determined through parsing of a uniform resource locator (URL) of the candidate phishing webpage.

3. The computer-implemented method of claim 1, wherein the candidate phishing webpage includes the login screen component and additional text or imagery, and wherein identifying the login screen component within the image of the candidate phishing webpage includes differentiating the login screen component from the additional text or imagery.

4. The computer-implemented method of claim 1, wherein the encoder is a component of an autoencoder, wherein the autoencoder includes both the encoder and a decoder, wherein both the encoder and the decoder are separate neural networks.

5. The computer-implemented method of claim 4, further comprising:
   training the autoencoder on training data comprising sample webpage images, wherein at least a portion of the sample webpage images include login screen components, and iteratively performing a set of operations for each of the sample webpage images including:
      providing a first sample webpage image to the encoder resulting in generation of a first sample latent representation,
      decoding the first sample latent representation by the decoder thereby producing a reconstructed version of a sample login component of the first sample webpage image,
      comparing the reconstructed version of the sample login component of the first sample webpage image with an original version of the sample login component of the first sample webpage image resulting in computation of a loss, and
      adjusting a set of parameters of one or more of the encoder or the decoder based on the loss.

6. The computer-implemented method of claim 5, wherein, following training, the encoder is stored for subsequent deployment and the decoder is discarded.

7. The computer-implemented method of claim 5, wherein layers of the encoder are asymmetrical to layers of the decoder.

8. A computing device, comprising:
   a processor; and
   a non-transitory computer-readable medium having stored thereon instructions that, when executed by the processor, cause the processor to perform operations including:
      obtaining an image of a candidate phishing webpage that includes a login screen component, wherein a login screen component includes one or more user interface (UI) elements configured to receive confidential information of an individual;

deploying an encoder configured to take the image of the candidate phishing webpage as input, identify the login screen component within the image of the candidate phishing webpage and generate a latent representation corresponding the login screen component, wherein the encoder is a neural network that includes an input layer that receive the image of the candidate phishing webpage and one or more hidden layers that reduce a dimensionality of the image of the candidate phishing webpage resulting in the latent representation;

deploying a machine learning model trained and configured to classify the login screen component into one of a predefined set of classes through analysis of the latent representation corresponding the login screen component;

correlating a class assigned to the login screen component with an allow/deny list pertaining to a domain of the candidate phishing webpage; and identifying the candidate phishing webpage as either a phishing webpage or a non-phishing webpage based on the correlating of the class assigned to the login screen component with the allow/deny list.

9. The computing device of claim 8, wherein the domain of the candidate phishing webpage is determined through parsing of a uniform resource locator (URL) of the candidate phishing webpage.

10. The computing device of claim 8, wherein the candidate phishing webpage includes the login screen component and additional text or imagery, and wherein identifying the login screen component within the image of the candidate phishing webpage includes differentiating the login screen component from the additional text or imagery.

11. The computing device of claim 8, wherein the encoder is a component of an autoencoder, wherein the autoencoder includes both the encoder and a decoder, wherein both the encoder and the decoder are separate neural networks.

12. The computing device of claim 11, further comprising:

training the autoencoder on training data comprising sample webpage images, wherein at least a portion of the sample webpage images include login screen components, and iteratively performing a set of operations for each of the sample webpage images including:

providing a first sample webpage image to the encoder resulting in generation of a first sample latent representation, decoding the first sample latent representation by the decoder thereby producing a reconstructed version of a sample login component of the first sample webpage image, comparing the reconstructed version of the sample login component of the first sample webpage image with an original version of the sample login component of the first sample webpage image resulting in computation of a loss, and adjusting a set of parameters of one or more of the encoder or the decoder based on the loss.

13. The computing device of claim 11, wherein, following training, the encoder is stored for subsequent deployment and the decoder is discarded.

14. The computing device of claim 11, wherein layers of the encoder are asymmetrical to layers of the decoder.

15. A non-transitory computer-readable medium having stored thereon instructions that, when executed by one or more processors, cause the one or more processor to perform operations including:

obtaining an image of a candidate phishing webpage that includes a login screen component, wherein a login screen component includes one or more user interface (UI) elements configured to receive confidential information of an individual;

deploying an encoder configured to take the image of the candidate phishing webpage as input, identify the login screen component within the image of the candidate phishing webpage and generate a latent representation corresponding the login screen component, wherein the encoder is a neural network that includes an input layer that receive the image of the candidate phishing webpage and one or more hidden layers that reduce a dimensionality of the image of the candidate phishing webpage resulting in the latent representation;

deploying a machine learning model trained and configured to classify the login screen component into one of a predefined set of classes through analysis of the latent representation corresponding the login screen component;

correlating a class assigned to the login screen component with an allow/deny list pertaining to a domain of the candidate phishing webpage; and identifying the candidate phishing webpage as either a phishing webpage or a non-phishing webpage based on the correlating of the class assigned to the login screen component with the allow/deny list.

16. The non-transitory computer-readable medium of claim 15, wherein the domain of the candidate phishing webpage is determined through parsing of a uniform resource locator (URL) of the candidate phishing webpage.

17. The non-transitory computer-readable medium of claim 15, wherein the candidate phishing webpage includes the login screen component and additional text or imagery, and wherein identifying the login screen component within the image of the candidate phishing webpage includes differentiating the login screen component from the additional text or imagery.

18. The non-transitory computer-readable medium of claim 15, wherein the encoder is a component of an autoencoder, wherein the autoencoder includes both the encoder and a decoder, wherein both the encoder and the decoder are separate neural networks.

19. The non-transitory computer-readable medium of claim 18, wherein the operations further include:

training the autoencoder on training data comprising sample webpage images, wherein at least a portion of the sample webpage images include login screen components, and iteratively performing a set of operations for each of the sample webpage images including:

providing a first sample webpage image to the encoder resulting in generation of a first sample latent representation, decoding the first sample latent representation by the decoder thereby producing a reconstructed version of a sample login component of the first sample webpage image, comparing the reconstructed version of the sample login component of the first sample webpage image with an original version of the sample login component of the first sample webpage image resulting in computation of a loss, and adjusting a set of parameters of one or more of the encoder or the decoder based on the loss.

20. The non-transitory computer-readable medium of claim 18, wherein layers of the encoder are asymmetrical to layers of the decoder.

* * * * *